United States Patent
Shimada et al.

[11] Patent Number: 6,043,475
[45] Date of Patent: Mar. 28, 2000

[54] FOCAL POINT ADJUSTMENT APPARATUS AND METHOD APPLIED TO MICROSCOPES

[75] Inventors: Masakazu Shimada, Hachioji; Takashi Nagano, Tokyo; Takashi Yoneyama, Hachioji; Nobuyuki Nagasawa, Hachioji; Hideaki Endo, Hachioji; Jitsunari Kojima, Ina; Atsuhiro Tsuchiya, Hachioji; Yukiko Saeki, Fukuoka, all of Japan

[73] Assignee: Olympus Optical Co., Ltd., Tokyo, Japan

[21] Appl. No.: 08/839,658

[22] Filed: Apr. 15, 1997

[30] Foreign Application Priority Data

| Apr. 16, 1996 | [JP] | Japan | 8-094243 |
| May 1, 1996 | [JP] | Japan | 8-110751 |
| Jan. 30, 1997 | [JP] | Japan | 9-016571 |
| Apr. 9, 1997 | [JP] | Japan | 9-090840 |

[51] Int. Cl.[7] .................................................... G02B 7/04
[52] U.S. Cl. ........................................ 250/201.3; 25/201.4
[58] Field of Search ............................. 250/201.3, 201.4; 359/392

[56] References Cited

U.S. PATENT DOCUMENTS

| 3,721,759 | 3/1973 | Lang | 178/7.2 |
| 4,186,301 | 1/1980 | Basire et al. | 250/204 |
| 4,564,296 | 1/1986 | Oshida et al. | 356/381 |
| 4,661,692 | 4/1987 | Kawasaki . | |
| 4,677,286 | 6/1987 | Liu | 250/201 |
| 4,902,101 | 2/1990 | Fujihara et al. | 350/320 |
| 4,958,920 | 9/1990 | Jorgens et al. | 350/530 |
| 4,959,552 | 9/1990 | Saffert et al. | 250/560 |
| 5,235,375 | 8/1993 | Yamana et al. | 354/400 |
| 5,245,173 | 9/1993 | Yamana et al. . | |
| 5,308,972 | 5/1994 | Nagano et al. . | |
| 5,489,966 | 2/1996 | Kawashima et al. | 355/43 |
| 5,647,025 | 7/1997 | Frost et al. | 382/255 |

FOREIGN PATENT DOCUMENTS

| 61-193417 | 12/1986 | Japan . |
| 2-109008 | 4/1990 | Japan . |
| 2-297514 | 12/1990 | Japan . |
| 4-35847 | 8/1992 | Japan . |
| 7-199086 | 8/1995 | Japan . |
| 8-75980 | 3/1996 | Japan . |

Primary Examiner—Edward P. Westin
Assistant Examiner—Thanh X. Luu
Attorney, Agent, or Firm—Frishauf, Holtz, Goodman, Langer & Chick, P.C.

[57] ABSTRACT

A focal point adjustment apparatus applied to an optical apparatus with a projection optical system, comprises, an object lens, a stage on which a plate member on which a subject is put for measurement is placed, provision unit for providing the thickness of the plate member for measurement, determining unit for determining data on the distance between the object lens and the stage on the basis of the thickness of the plate member for measurement provided by the provision unit, and focusing unit for adjusting the distance between the object lens and the stage on the basis of the data on the distance between the object lens and the stage determined by the determining unit.

4 Claims, 22 Drawing Sheets

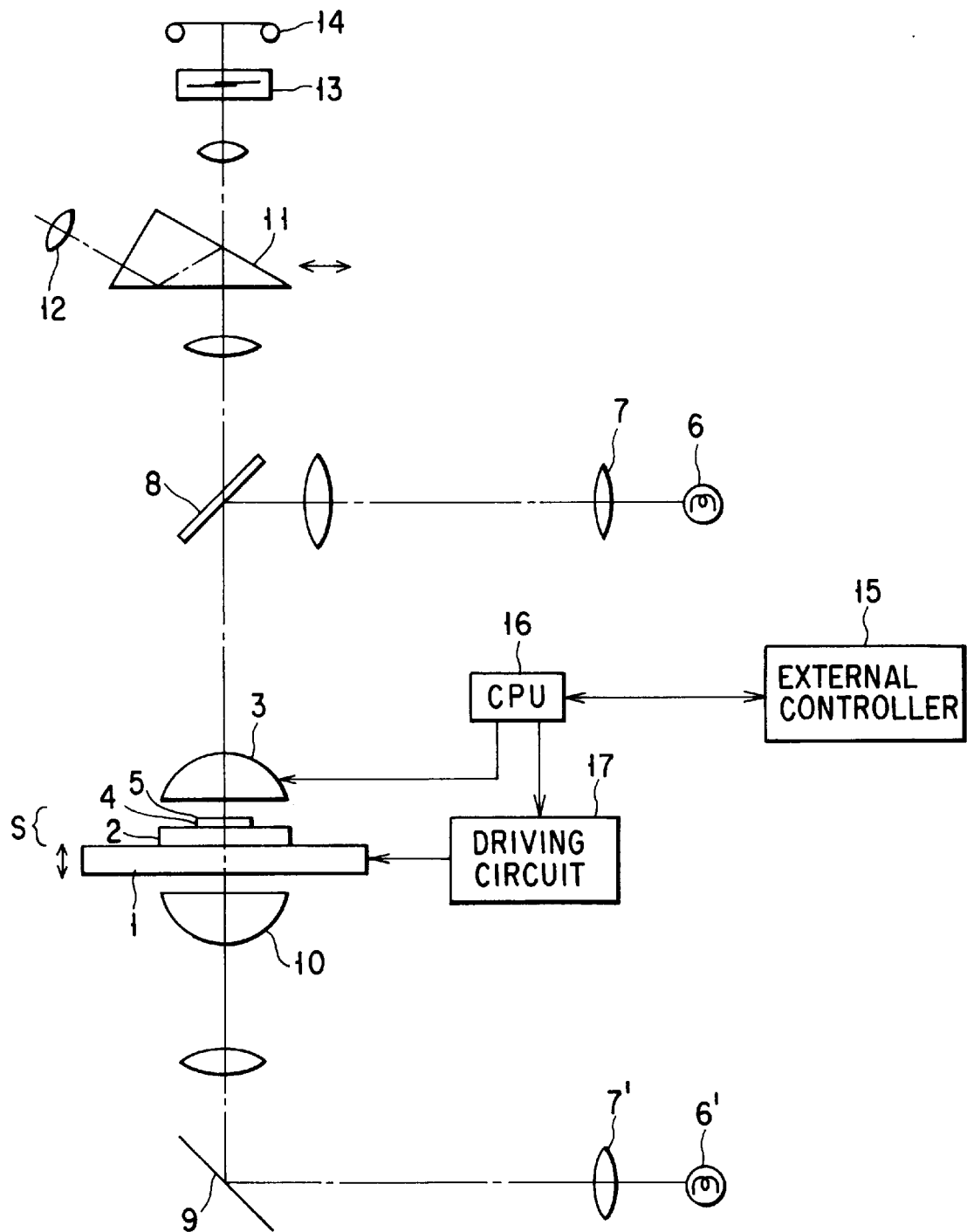
F I G. 1

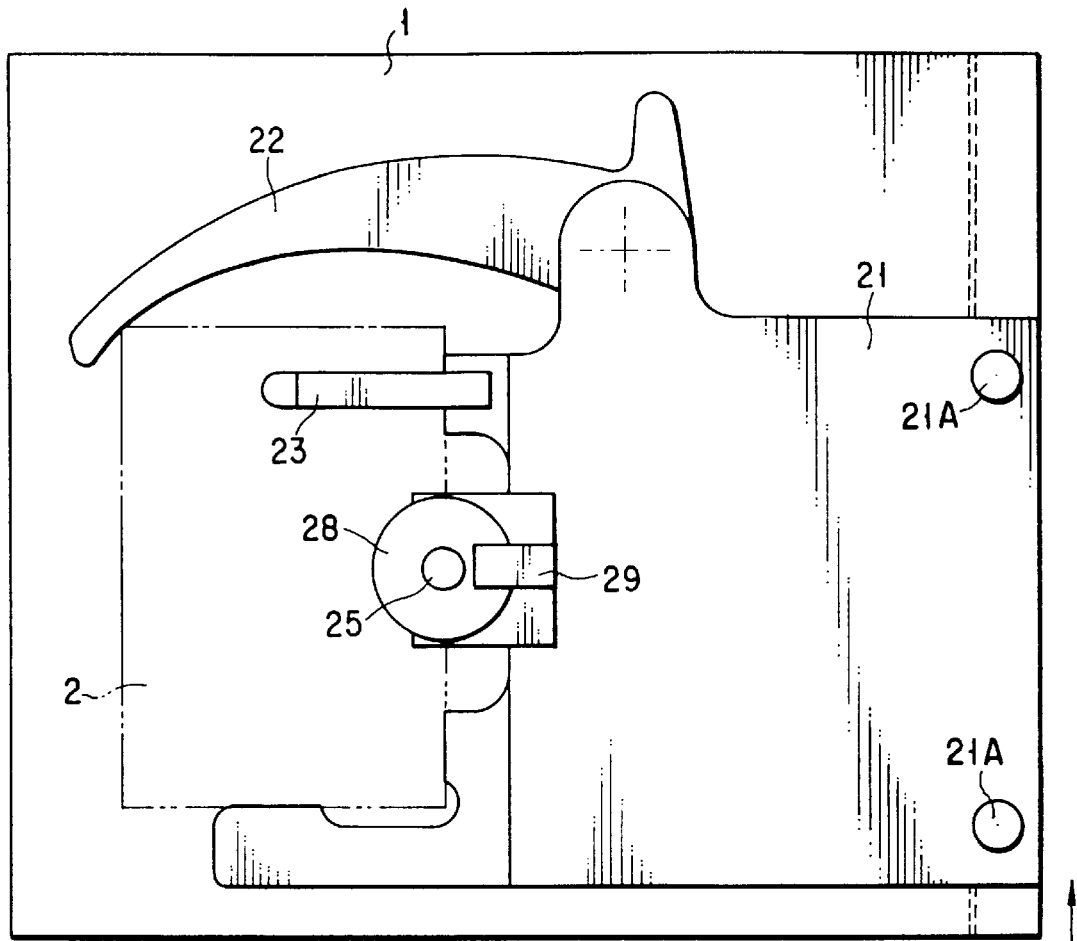
F I G. 9A
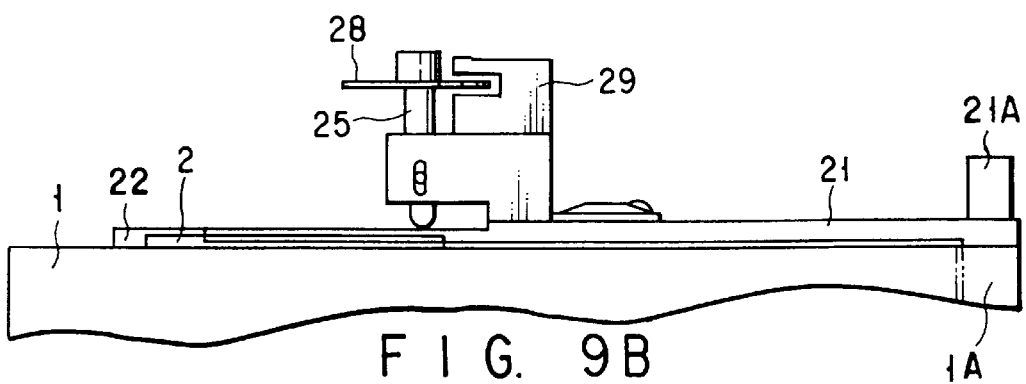
F I G. 9B

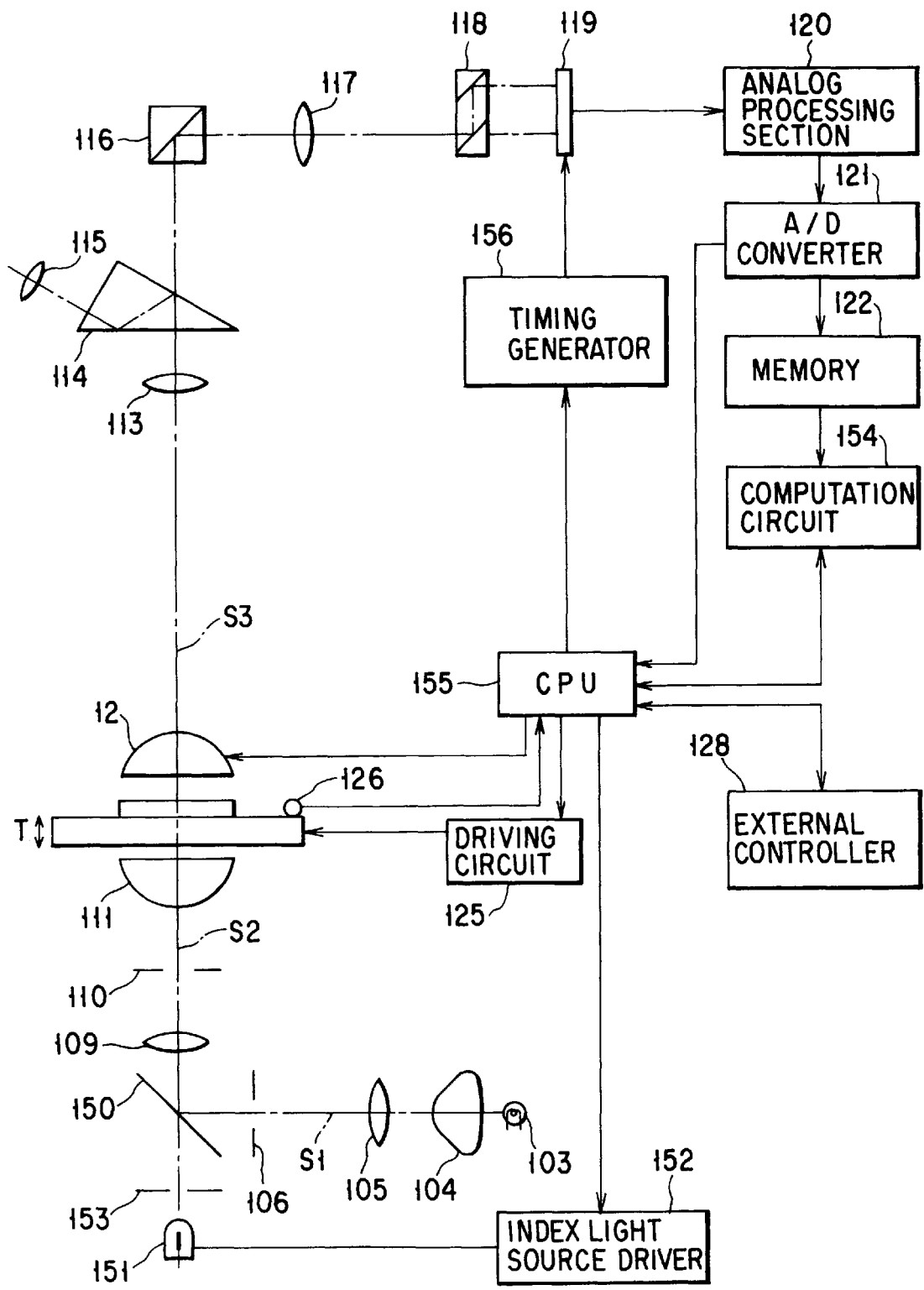
F I G. 16

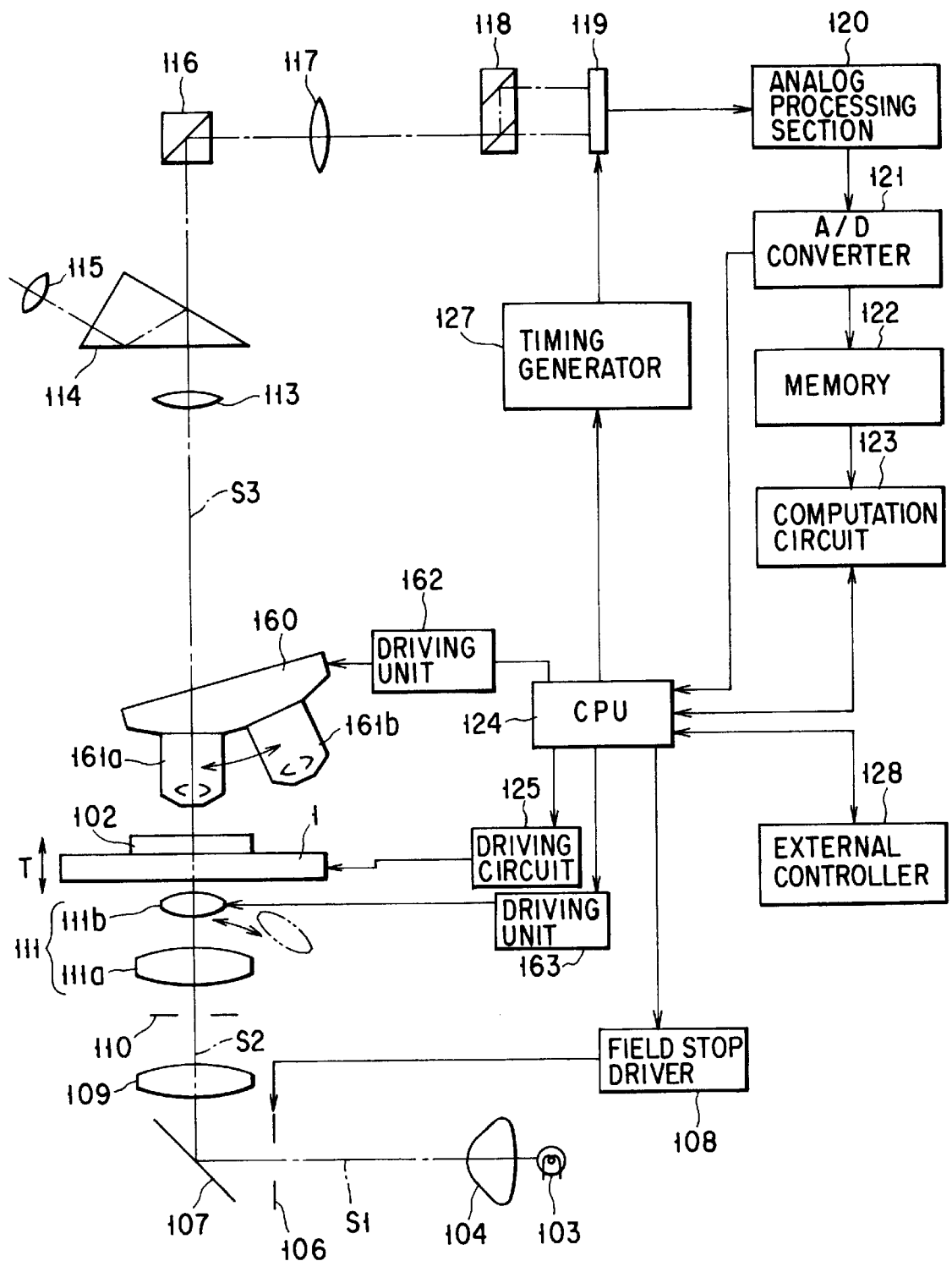
F I G. 20

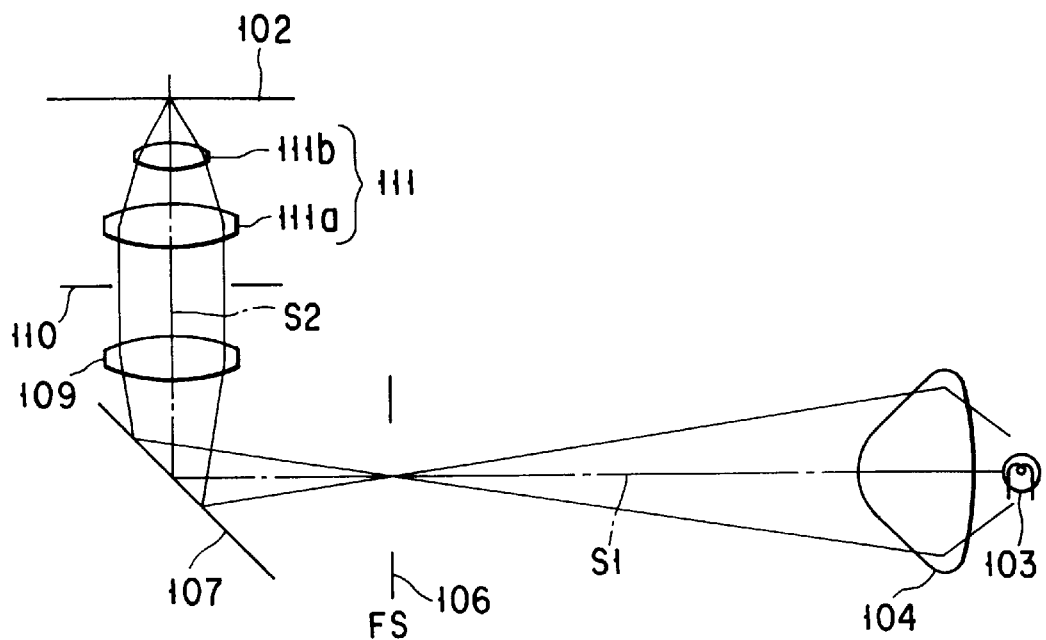
F I G. 21
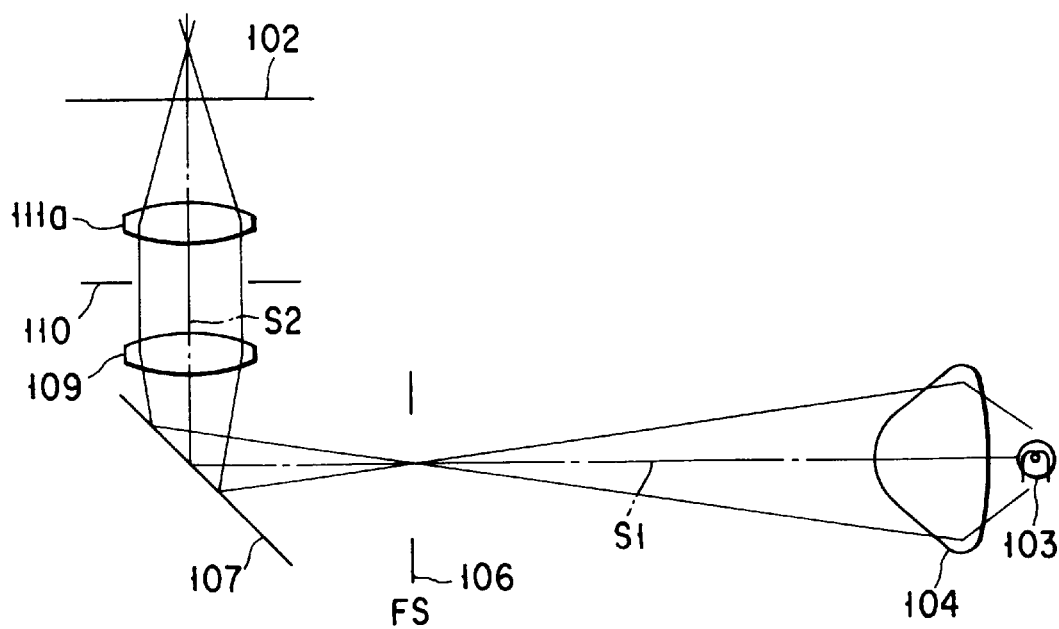
F I G. 22

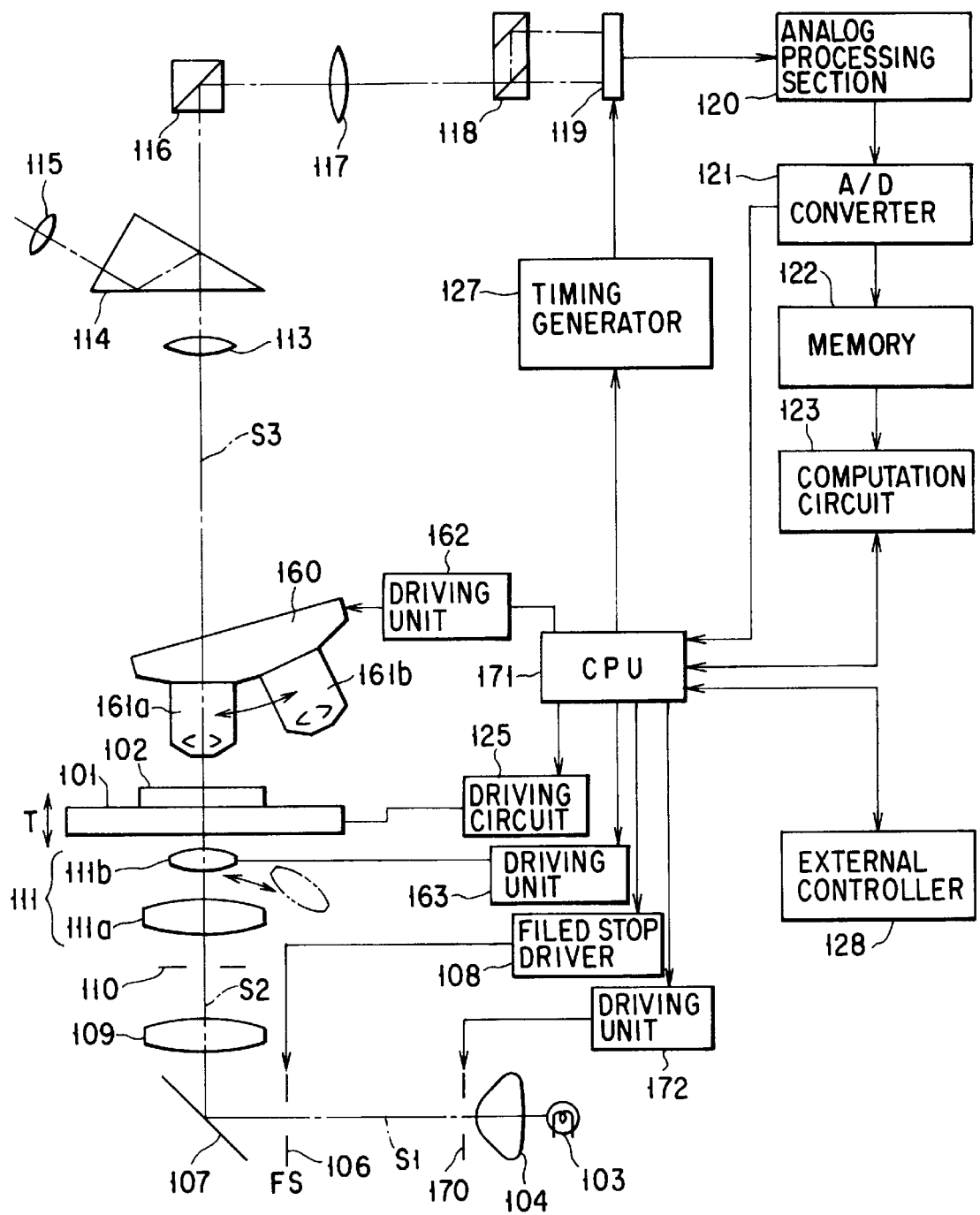
F I G. 23

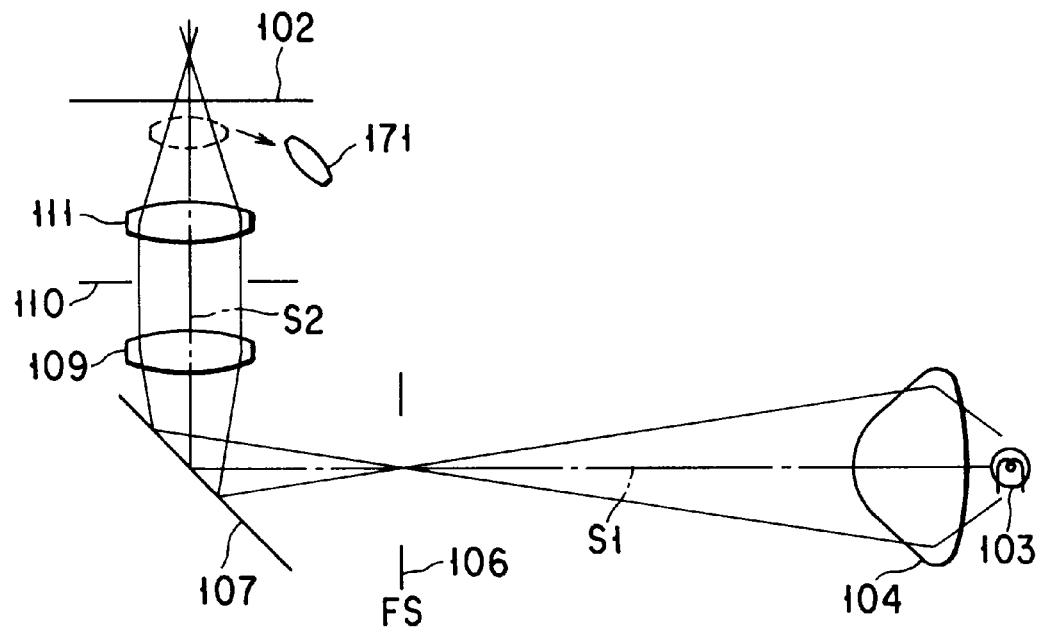
F I G. 27
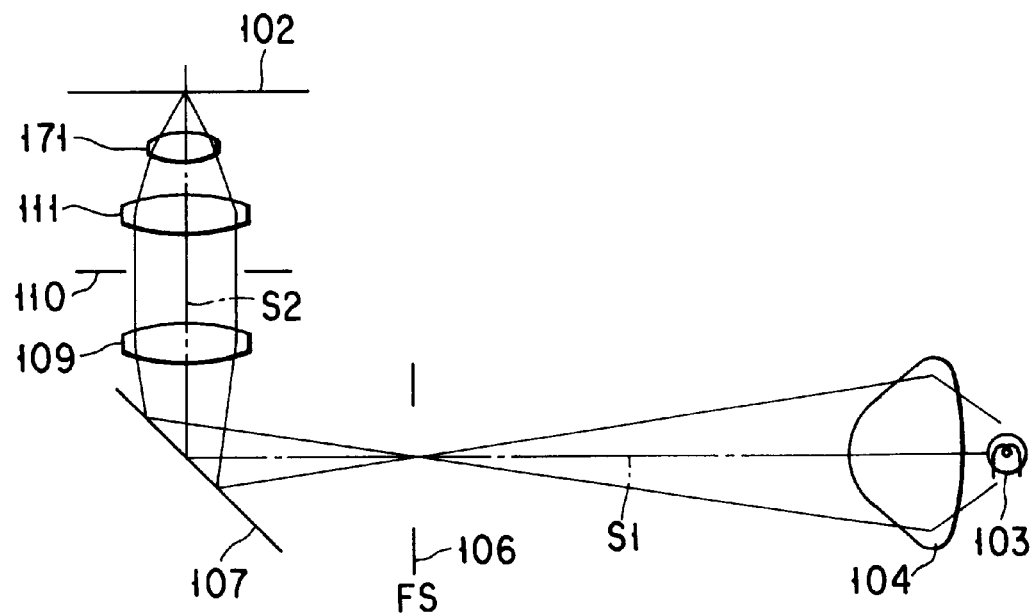
F I G. 28

FOCAL POINT ADJUSTMENT APPARATUS AND METHOD APPLIED TO MICROSCOPES

BACKGROUND OF THE INVENTION

This invention relates to a focal point adjustment apparatus and method applied to microscopes used in the fields of medicine and biology.

Some of the factors that decrease the focusing accuracy are the effect of dirt adhering to subjects, the effect of dirt adhering to a plate member, such as a slide or a cover glass, on which a subject, such as biological tissue, is placed, and/or the effect of dirt adhering to a condenser lens that projects light on the plate member.

When deposits, such as dirt, adhere to the optical system, which is typically composed of a subject, a plate member and/or a condenser lens, the image of deposits gets mixed several thousand to several hundred $\mu$m away from the image of the subject. The image of the deposits has a higher contrast than the image of the subject. In this case, when an automatic focusing operation is carried out, the microscope is focused on the deposits rather than the subject, causing the problem of lowering the focusing accuracy with respect to the subject.

The problem becomes more serious, depending on the type of plate member used. Specifically, for plate members, the standard slide has a thickness of 1.0 (−0.1 to +0.2) mm and the standard cover glass has a thickness of 0.17 (−0.02 to +0.01) mm. A plate member used for a microscope does not always use the standard slide or the standard cover glass. In this case, the above thicknesses are Japanese Industrial Standard. Depending on the wish of the observer and the nature of the subject, a slide and cover glass differing in thickness from the standard slide and cover glass, respectively, may be used.

The distance between the top surface position (reference in-focus position) of the slide put on the stage and the mounting position of the object lens to the revolver is generally fixed to a constant value. The constant value is usually a reference focal length of 45.0 mm. In the case of the standard slide of a thickness of 1.0 (±0.2 to 0.3) mm, the distance between the stage top surface position and the mounting position of the object lens to the revolver is 46.0 (45.0+1.0) mm. The distance between the stage top surface position and the mounting position of the object lens to the revolver has a fixed value.

When the distance keep, and a slide and a cover glass that differ in thickness from the standard slide and the standard cover glass are used, however, the distance between the top surface position (reference in-focus position) of the slide and the mounting position of the object lens to the revolver has a value deviating from the reference focal length 45.0 mm. Therefore, when a slide and a cover glass that differ in thickness from the standard slide and the standard cover glass are used, the execution of automatic focusing may decrease the focusing accuracy with respect to the subject. Additionally, when deposits are on the plate member, such as a slide, as mentioned above, an optical system focuses to the deposits, and the focusing accuracy with respect to the subject decreases seriously.

One of the prior art techniques for solving such a problem is an area division distance-measuring system which adapts an area of without deposit to be elected, for use with video cameras or electronic still cameras.

With such techniques, however, control and image processing are too complicated and costly for application to microscopes.

An object of the present invention is to provide a practical focal point adjustment apparatus and method applied to a microscope which are capable of making a focus adjustment with high accuracy without being affected by the plate member or deposits, even when a plate member of a different thickness is used or when deposits are on the optical system.

Another object of the present invention is to provide a practical microscope capable of making a focus adjustment with high accuracy without being affected by the plate member or deposits, even when a plate member of a different thickness is used or when deposits are on the optical system.

BRIEF SUMMARY OF THE INVENTION

The foregoing objects are accomplished providing a focal point adjustment apparatus applied to an optical apparatus with a projection optical system, comprising: an object lens; a stage on which a plate member on which a subject is put for measurement is placed; provision means for providing the thickness of the plate member for measurement; determining means for determining data on the distance between the object lens and the stage on the basis of the thickness of the plate member for measurement provided by the provision means; and focusing means for adjusting the distance between the object lens and the stage on the basis of the data on the distance between the object lens and the stage determined by the determining means.

The foregoing objects are accomplished by providing an automatic focal point adjustment apparatus that makes a focus adjustment by projecting illumination light on a specimen through a condenser lens and changing the relative position between the object lens and the specimen, the automatic focal point adjustment apparatus comprising: condenser lens changing means for changing the focal length of the condenser lens according to the observation magnification of the object lens; and index inserting and removing means for inserting and removing a focus adjustment index in the position conjugate to the specimen with respect to the condenser lens according to the focal point of the condenser lens changed by the condenser lens changing means, wherein the object lens is focused on the specimen on the basis of the contrast of the image of the specimen on the surface of the specimen.

In this case, it is possible not only to change at least the focal length of the condenser lens, but also to insert the index in the position conjugate to the specimen with respect to the condenser lens.

The foregoing objects are accomplished by providing a focal point adjustment method applied to an optical apparatus including an observation optical system and an illumination optical system that make a focus adjustment by changing the relative distance between a stage on which a plate member on which a subject is put for measurement is placed and an object lens, the focal point adjustment method comprising: the step of projecting a marker provided in at least one of the observation optical system and illumination optical system on the plate member for measurement; the step of finding the in-focus distance by sensing the amount of defocus between the prepared reference in-focus position information and the information on the measured in-focus position of the marker image projected on the plate member; and the step of making a focus adjustment by changing the relative position between the stage and the object lens on the basis of the in-focus distance.

The foregoing objects are accomplished by providing an automatic focal point adjusting method of making a focus adjustment by projecting illumination light on a specimen through a condenser lens and changing the relative position between the object lens and the specimen, wherein more than one index for focus adjustment is placed in the position conjugate to the specimen with respect to the condenser lens with each focal length, when the focal length of the condenser lens is changed according to the observation magnification of the object lens.

The foregoing objects are accomplished by providing a microscope comprising: a stage on which a plate member on which a subject is put for measurement is placed; an observation optical system that is optically associated with the stage and includes an object lens; an illumination optical system optically associated with the stage; provision means for providing the thickness of the plate member for measurement; determining means for determining data on the distance between the object lens and the stage on the basis of the thickness of the plate member for measurement provided by the provision means; and focusing means for adjusting the distance between the object lens and the stage on the basis of the data on the distance between the object lens and the stage determined by the determining means.

Additional objects advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a schematic diagram of the optical system of a microscope to which an automatic focal point adjustment apparatus according to a first embodiment of the present invention is applied;

FIG. 9A is a top view of the specimen holder of the seventh embodiment of the present invention;

FIG. 9B is a side view of the specimen holder of the seventh embodiment of the present invention;

FIG. 16 is a schematic diagram of an eleventh embodiment of the present invention;

FIG. 20 shows the configuration of a microscope capable of changing the magnification of the object lens;

FIG. 21 is an enlarged view of the configuration of the illumination optical system of the microscope;

FIG. 22 is an enlarged view of the configuration of the illumination optical system with the front lens removed;

FIG. 23 is a schematic diagram of a twelfth embodiment of the present invention;

FIG. 27 is a schematic diagram of a fourteenth embodiment of the present invention; and FIG. 28 is a schematic diagram of the microscope with the front lens inserted in the fourteenth embodiment.

DETAILED DESCRIPTION OF THE INVENTION

Figure 2:
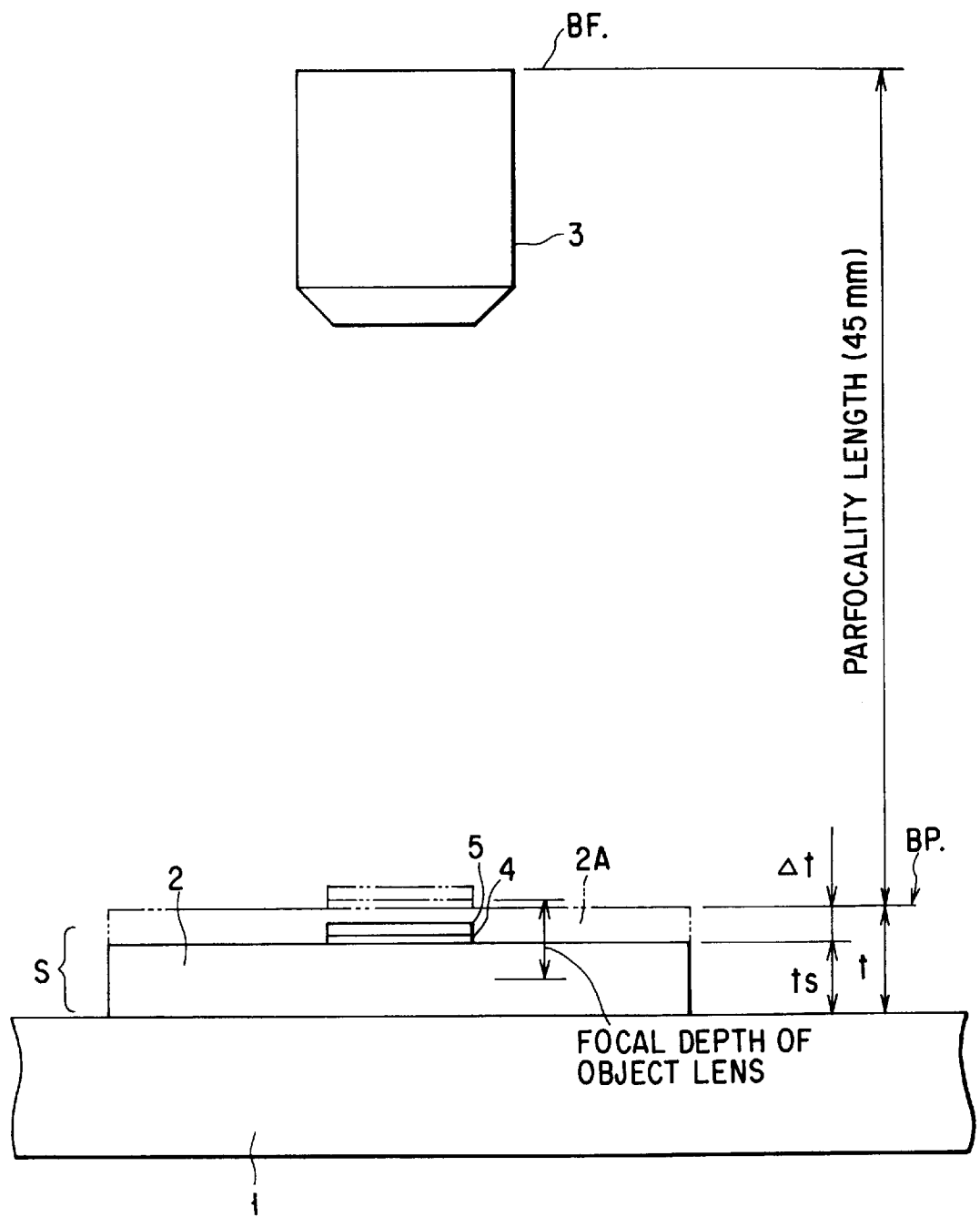
FIG. 2 is a detailed diagram of the vicinity of the stage in the first embodiment.

The present invention relates to a microscope that includes a plate member composed of a slide and a cover glass and is used in such a manner that a subject, such as biological tissue, is put on the slide and the subject is covered with the cover glass to form a specimen, which is ready to be observed. The microscope comprises a stage on which the plate member is placed, an observation optical system associated with the stage, an illumination optical system optically associated with the stage, a provision section that provides the thickness of the plate member for measurement, a determining section that determines data on the distance between the object lens of the observation optical system and the stage on the basis of the thickness of the plate member for measurement provided at the provision section, and a focusing section that adjust the distance between the object lens and the stage on the basis of the data on the distance between the object lens and the stage determined at the determining section.

Hereinafter, a microscope according to a first embodiment of the present invention and an automatic focal point sensing apparatus applied to the microscope will be explained by reference to FIG. 1 showing the functions and configuration of them.

The optical system of the microscope includes an observation optical system and an illumination optical system. The microscope of the embodiment has a transmission illumination optical system. As shown in FIG. 1, the optical system includes a falling projection light source 6 for a falling projection sensing mirror that illuminates a specimen S composed of a slide 2 placed on a stage 1 that can be moved up and down along the optical axis, a subject 4, and a cover glass 5 and a transmission light source 6' for a transmission sensing mirror. The falling projection illumination light from the falling projection light source 6 passes through a contact lens 7, is reflected by a half mirror 8 toward the side of the specimen, passes through an object lens 3 with a focal depth greater than the thickness of the subject 4, and enters the specimen S. The transmission illumination light from the transmission light source 6' passes through a collector lens 7', is reflected by a mirror 9 placed below the stage 1 toward the side of the specimen S, passes through the optical path opening of the stage 1 via a condenser lens 10, and then illuminates the specimen from below.

The luminous flux from the specimen S produced by either the light source 6 or 6' passes through the object lens 3 and half mirror 8 constituting the observation optical system and enters a prism 11, which directs it to an eyepiece 12. When the prism 11 is removed from the optical path, the luminous flux passed the half mirror 8 goes through a shutter 13 and enters the film surface 14.

There is provided an external controller 15 that provides control of the start and stop of automatic focusing and enables the observer to enter the thickness of the slide 2 or specify the magnification of the object lens 3. On the basis of the thickness of the slide 2 entered at the external controller 15, a CPU 16 computes the movement of and the direction of movement of the stage 1 to move the specimen S to the in-focus position of the optical system and supplies the result to a driving circuit 17 as a control signal. The driving circuit 17 makes a focus adjustment by moving the stage up and down on the basis of the control signal from the CPU 16.

Now, the operation of the embodiment will be explained. FIG. 2 is a detailed diagram of the vicinity of the specimen S of FIG. 1. The specimen S composed of the cover glass 5, subject 4 and slide 2 is placed on the stage 1 capable of moving up and down. It is assumed that the thickness of the slide 2 is ts, the thickness of a reference slide 2A explained later is t, and the focal point position of the object lens 3 is a constant distance, for example, 45.0 mm, away from the tube mounting surface BF of the object lens 3. The focal point position is determined to be the reference in-focus position BP on the reference slide 2A.

To focus the microscope on the top surface of the slide 2 of the specimen S, it is found from the following equation with the upward direction positive in the figure that the stage 1 has only to be moved a distance of $\Delta t$ from the reference in-focus position BP:

$$\Delta t = t - ts \quad (1)$$

Therefore, when the thickness t of the reference slide has been entered in the CPU 16, the observer can cause the CPU 16 to compute $\Delta t$ using equation (1) by just entering the thickness ts of the slide 2 from the external controller 15. The CPU 16 sends a control signal whose sign is the direction of movement and whose absolute value is the movement to the driving circuit 17, which then moves the stage, thereby causing the microscope to be focused on the top surface of the slide 2.

As described above, when the magnification of the object lens 3 is relatively low and its focal depth is deep, that is, when the error in the thickness of slide 2 or the thickness of the specimen S is smaller than the focal depth of the object lens 3, the focus adjustment functions particularly effectively. Focusing the microscope on the surface of the slide 2 causes the specimen S to lie in the focal depth of the object lens 3, thereby producing an accurately focused image.

Since image processing is not performed in the embodiment, even if dirt adheres to the cover glass 5 or slide 2, it will be possible to focus the microscope with high accuracy using the low-cost, compact automatic focus adjustment apparatus without being affected by the dirt.

Figure 3:
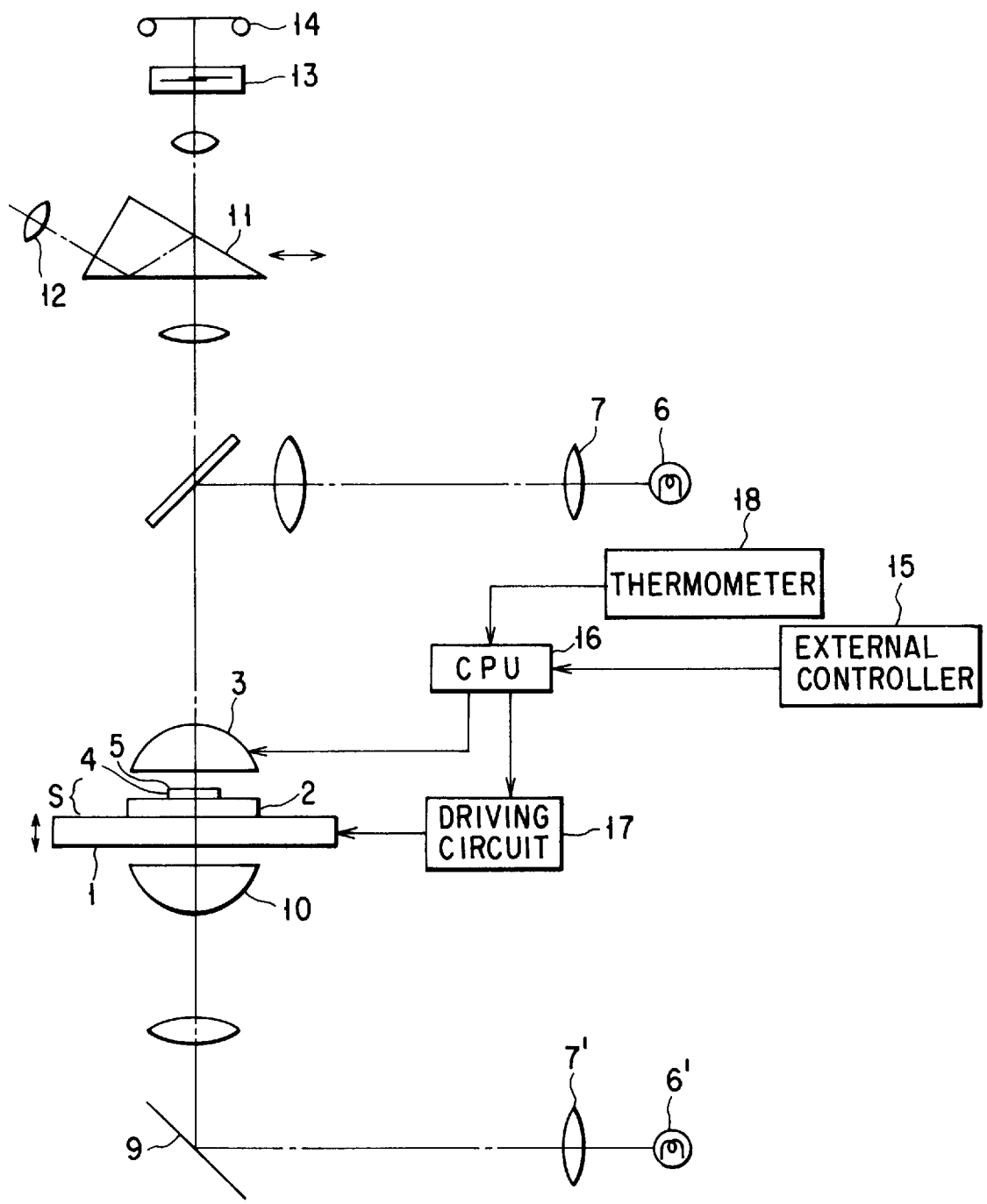
FIG. 3 is a schematic diagram of a second embodiment of the present invention.

Next, a second embodiment of the present embodiment will be explained by reference to FIG. 3. Like the first embodiment of FIG. 1, the second embodiment is a microscope having a transmission illumination optical system. In FIG. 3, the same parts as those in FIG. 1 are indicated by the same reference symbols and explanation of them will not be given. In FIG. 3, there is provided a thermometer 18 that senses the atmospheric temperature of the object lens 3 and sends the sensed temperature data to the CPU 16.

Figure 4:
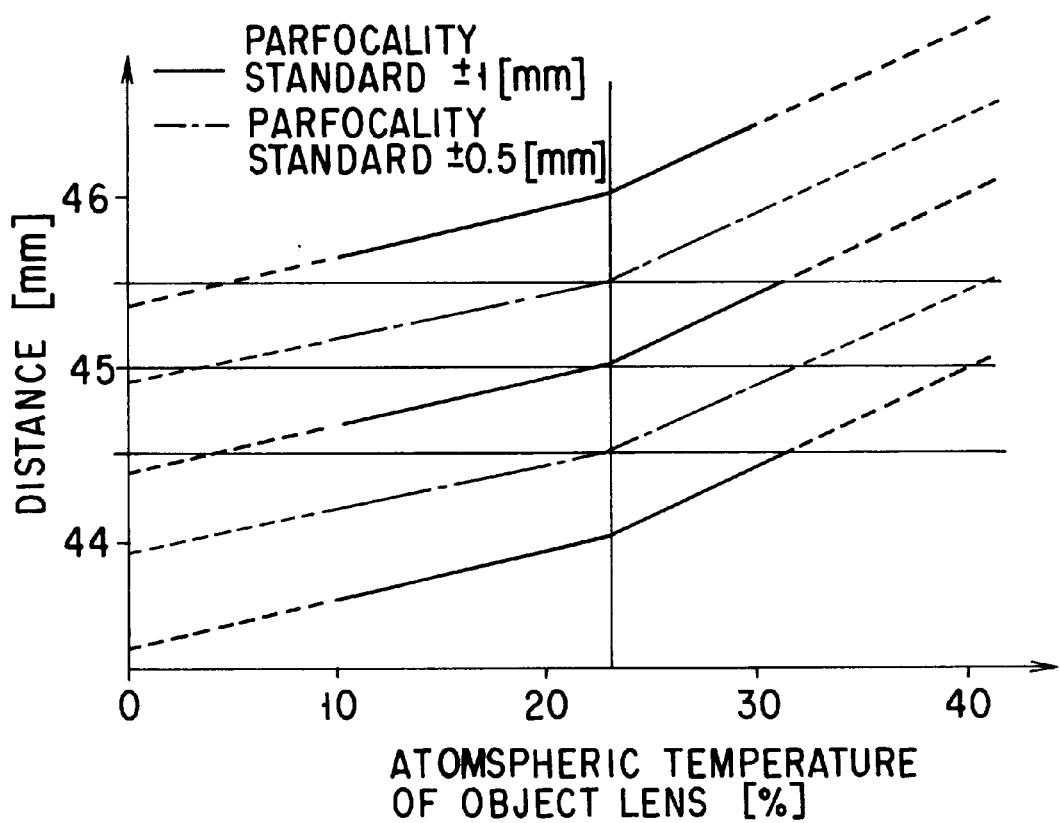
FIG. 4 shows the relationship between the atmospheric temperature of the object lens related to the second embodiment and the distance between the tube mounting surface of the object lens and the specimen focal point position.

With this configuration, the control operation that the CPU 16 chiefly performs is as follows. FIG. 4 shows how the distance between the tube mounting surface BF of the object lens 3 and the specimen focal point position changes with the atmospheric temperature of the object lens 3. From this characteristic diagram, the difference $\Delta t_{temp}$ from the reference in-focus position with respect to the atmospheric temperature is obtained using the following equation:

$$\Delta t_{temp} = R \times temp \quad (2)$$

where R: temperature coefficient temp: temperature ° C.

On the basis of the temperature data from the thermometer 18 and the thickness ts of the slide inputted from the external controller 15, the CPU 16 makes calculations using the following equation:

$$\Delta t = t - ts - \Delta t_{temp} \quad (3)$$

The CPU 16 determines the direction of movement of the stage 1 and its movement from the calculation result and transmits the control signal to the driving circuit 17, which moves the stage 1.

As described above, because the distance between the tube mounting surface BF of the object lens 3 and the specimen focal point position is corrected by sensing the atmospheric temperature of the object lens 3, the second embodiment achieves higher focusing accuracy than the first embodiment.

Figure 5:
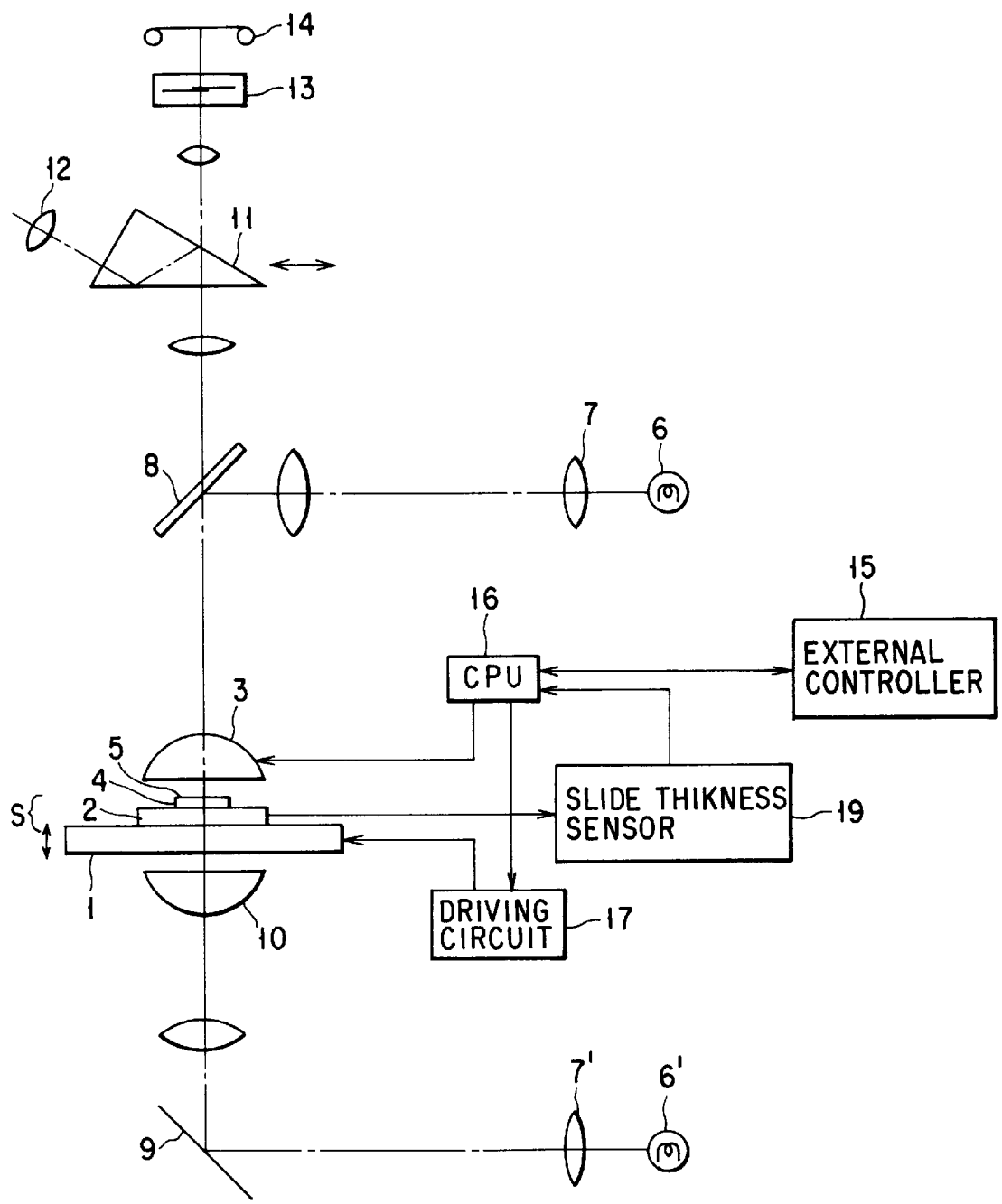
FIG. 5 is a schematic diagram of a third embodiment of the present invention.

Next, a third embodiment of the present embodiment will be explained by reference to FIG. 5. Like the first embodiment of FIG. 1 and the second embodiment of FIG. 3, the third embodiment is a microscope having a transmission illumination optical system. In FIG. 5, the same parts as those in FIG. 1 are indicated by the same reference symbols and explanation of them will not be given. In FIG. 5, there is provided a slide thickness sensor 19 that senses the thickness of the slide 2 constituting the specimen S on the stage 1. The thickness of the slide 2 sensed by the slide thickness sensor 19 is transmitted to the CPU 16. The slide thickness sensor 19 senses the thickness ts of the slide 2 by actually measuring the thickness of the slide 2 on the stage 1 or by reading the thickness-indicating bar code marked at the upper end of the slide 2, and then sends the thickness to the CPU 16.

On the basis of the thickness ts from the slide thickness sensor 19 and the thickness t of the reference slide 2A previously set, the CPU 16 calculates Δt using equation (1). The CPU produces a control signal from the calculation result and sends the control signal to the driving circuit 17, which then moves the stage so that the microscope may be focused accurately.

Since in focus adjustment in the third embodiment, image processing is not performed as in the second embodiment, even if dirt adheres to the cover glass 5 or slide 2, it will be possible to focus the microscope with high accuracy using the low-cost, compact automatic focus adjustment apparatus without being affected by the dirt. At the same time, the observer need not enter the thickness of the slide 2 from the external controller 15, which decreases the burden on the observer and makes it easier to use the microscope, assuring excellent workability.

Figure 6:
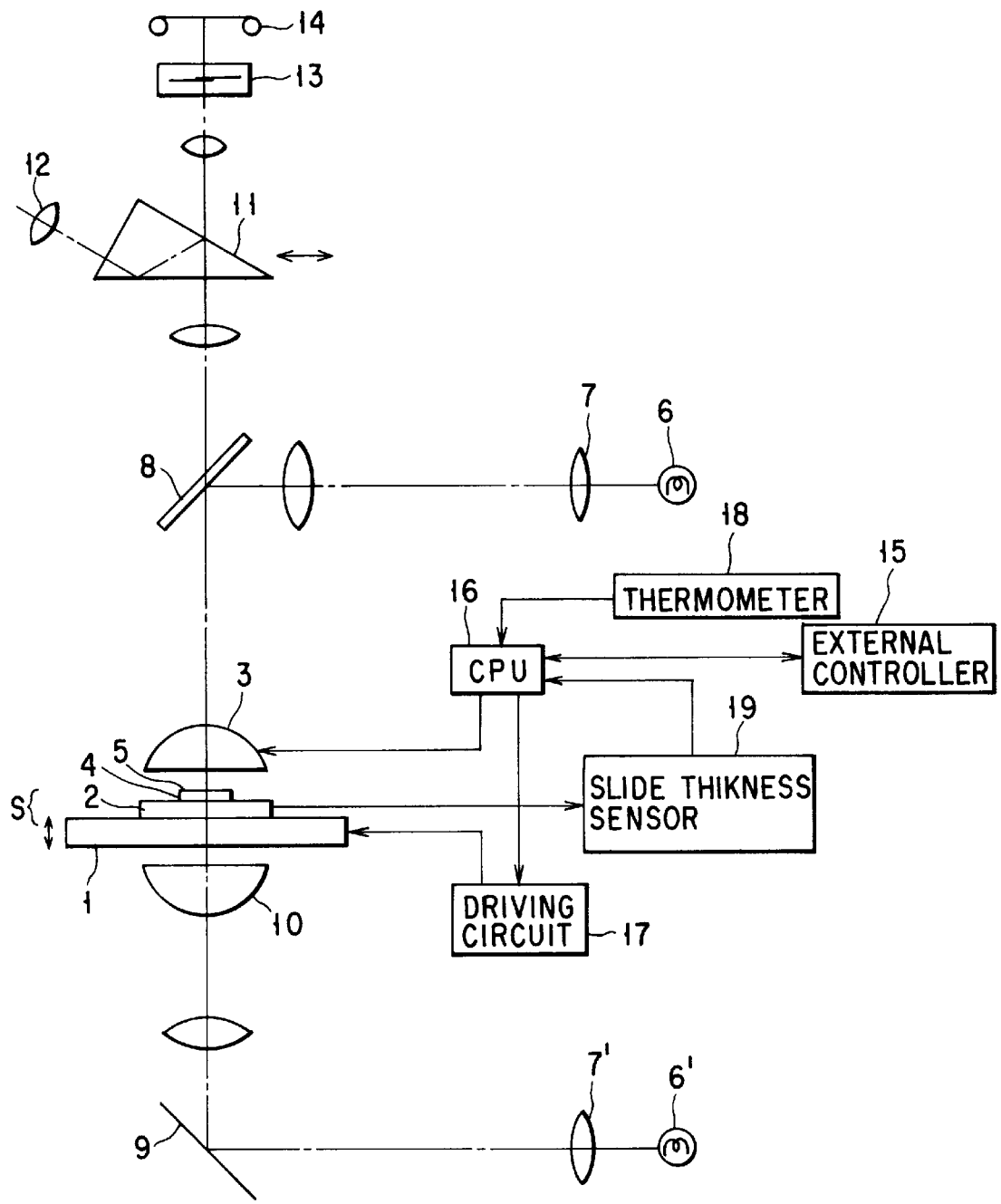
FIG. 6 is a schematic diagram of a fourth embodiment of the present invention.

Next, a fourth embodiment of the present embodiment will be explained by reference to FIG. 6. Like the first embodiment of FIG. 1, the second embodiment of FIG. 3, and the third embodiment of FIG. 5, the fourth embodiment is a microscope having a transmission illumination optical system. In FIG. 6, the same parts as those in FIG. 1 are indicated by the same reference symbols and explanation of them will not be given. The fourth embodiment is a combination of the second embodiment and the third embodiment. As shown in FIG. 6, the distance between the tube mounting surface BF of the object lens 3 and the specimen focal point position is corrected by sensing the atmospheric temperature of the object lens 3, which achieves higher focus accuracy. In addition to this feature, the observer need not enter the thickness of the slide 2 from the external controller 15, which decreases the burden on the observer and makes it easier to use the microscope, assuring excellent workability.

While in the first to fourth embodiments, the driving circuit 17 moves the stage up and down on the basis of the control signal from the CPU 16 to change the relative distance between the object lens 3 and the stage 1, the present invention is not restricted to this. For instance, the object lens 3 may be moved to change the relative distance.

In an automatic focal point sensing apparatus for a microscope having a focusing mechanism for making a focus adjustment by changing the relative position between the object lens and the specimen, the present invention is provided with means for sensing the thickness of a slide by holding the slide on which the specimen is placed with a slide holding device provided on the stage, calculating the in-focus position, and moving the slide to the in-focus position by means of the focusing mechanism.

With the present invention, in the case of a low magnification object lens whose focal depth is great, the adverse effect of dirt contributing to the deterioration of the focusing accuracy in automatic focal point sensing with an image processing unit can be eliminated by sensing thickness of the slide and determining the in-focus position.

The present invention has the following embodiment. In an automatic focal point sensing apparatus for a microscope having a focusing mechanism for making a focus adjustment by changing the relative position between the object lens and the specimen, the present invention is provided with means for sensing the thickness of a slide by holding the slide on which the specimen is placed with a slide holding device provided on the stage, determining a specimen searching range, making a focus adjustment by means of the focusing mechanism, and thereby moving the slide to the in-focus position.

With the present invention, since a high magnification lens has a very small focal depth, it is difficult to determine the in-focus position on the basis of the thickness of the slide, but focal point sensing can be done at very high speed with high accuracy by determining the focusing zone on the basis of the thickness of the slide and performing automatic focal point sensing by means of an image processing unit.

Hereinafter, embodiments of the above-described invention will be explained by reference to FIGS. 7 to FIGS. 10A and 10B.

Figure 7:
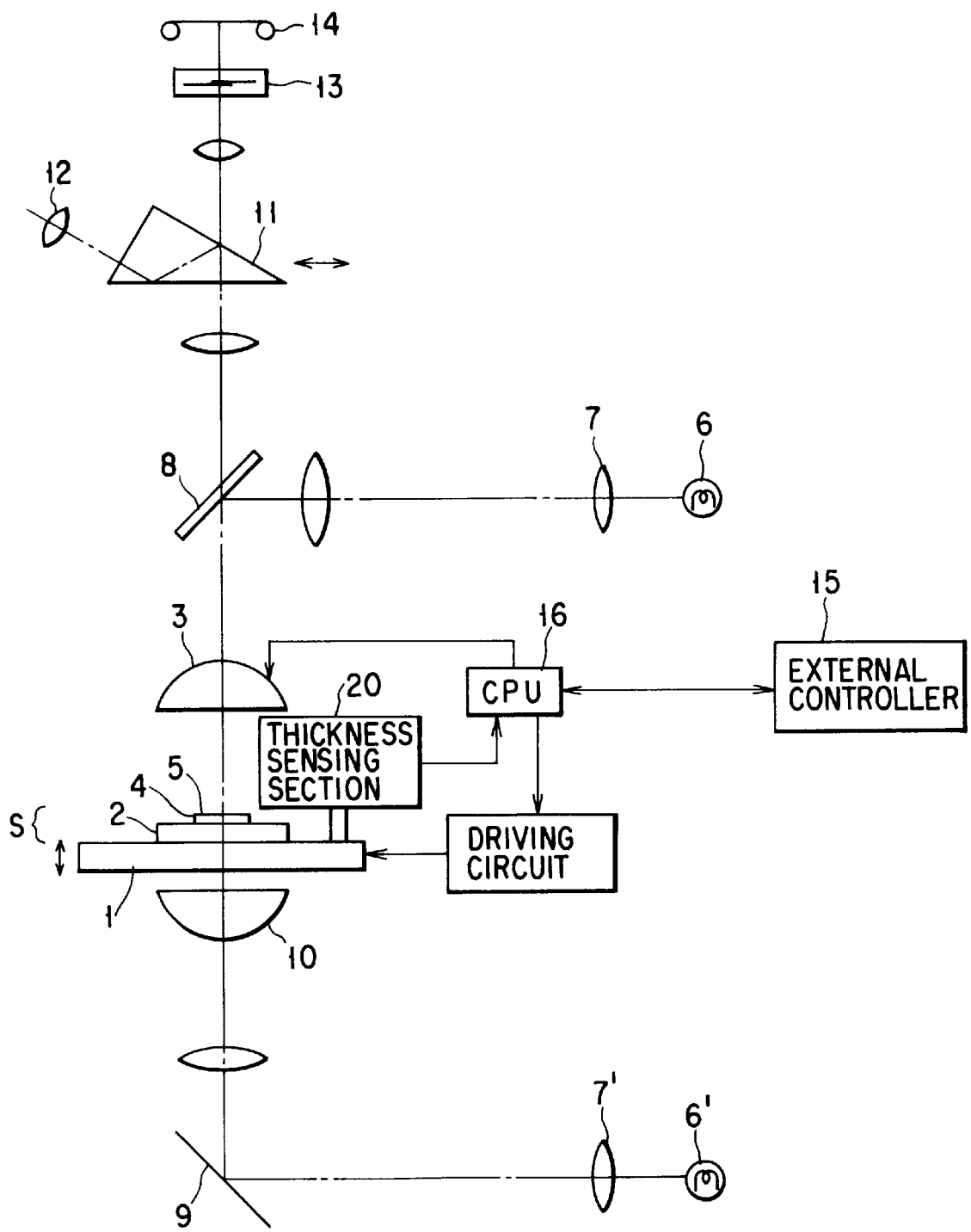
FIG. 7 is a schematic diagram of a fifth embodiment of the present invention.

A fifth embodiment of the present invention will be described by reference to FIG. 7. In FIG. 7, the same parts as those of FIG. 1 are indicated by the same reference symbols.

The fifth embodiment comprises a CPU 16, a driving circuit 17, a thickness sensing section 20 that senses the thickness of a slide, and an external controller 15 that enables the observer to specify the type of control, such as the start/stop of automatic focusing, the magnification of the object lens, and the like. The thickness sensing section 20 that senses the thickness of a slide 2 is provided on a specimen holder for holding the slide 2 on a stage 1. The thickness t of the slide 2 outputted from the thickness sensing section 20 is inputted to the CPU 16. On the basis of the thickness t and the data on the magnification of the object lens 3 inputted from the external controller 15, the CPU 16 computes the signal concerning the movement of the stage 1 and the direction of the movement and transmits it to the driving circuit 17. The driving circuit 17 moves the stage 1 up and down on the basis of the signal from the CPU 17 to make a focus adjustment.

Figure 8A:
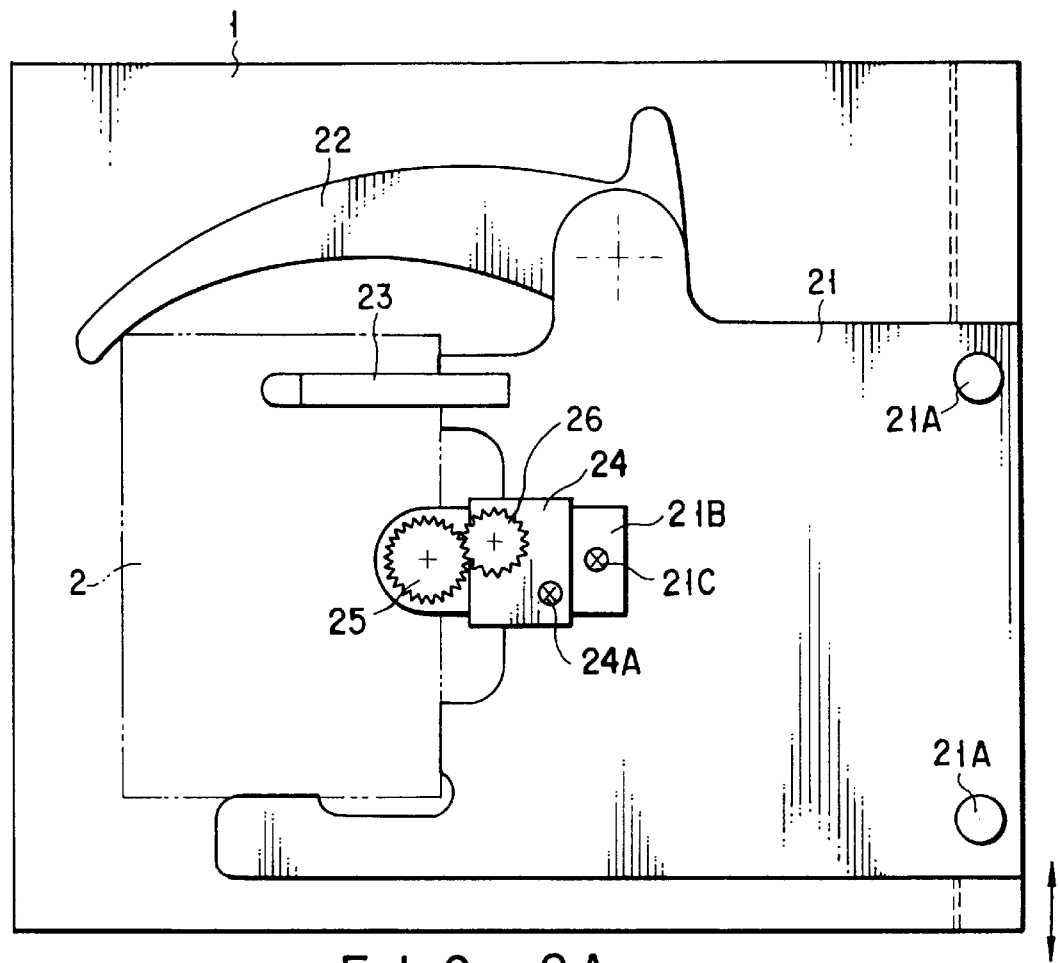
FIG. 8A is a top view of the specimen holder of the sixth embodiment of the present invention.
Figure 8B:
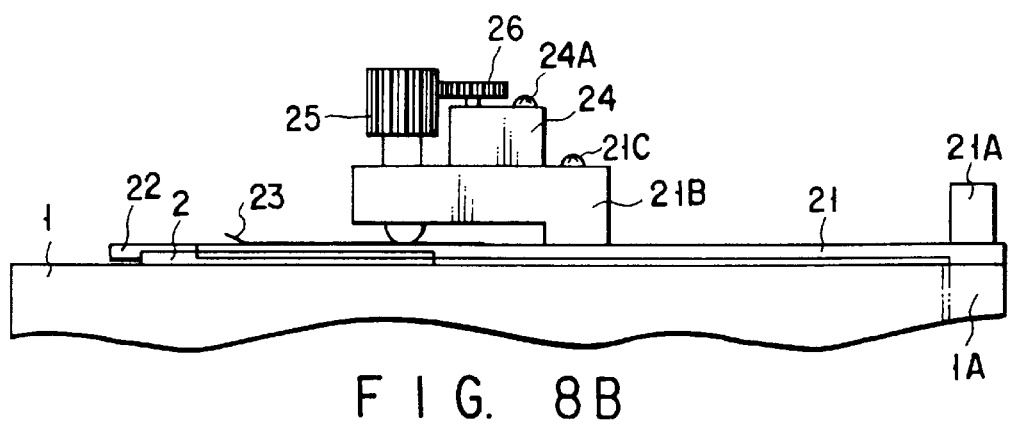
FIG. 8B is a side view of the specimen holder of the sixth embodiment of the present invention.

The configuration of the specimen holder incorporating the thickness sensing section 20 that senses the thickness of the slide 2 will be described by reference to FIG. 8A to FIG. 8C. FIG. 8A is a top view of the specimen holder of a sixth embodiment. FIG. 8B is a side view of the specimen holder of a sixth embodiment. The specimen holder body section 21 is arranged on a guide 1A of the stage 1 by a screw 21A. The guide 1A arranged on the stage 1 so as to slide in the direction of the arrow. The specimen holder body section 21 is provided with holding metal fittings 22 that holds the slide 2, hold-down metal fittings 23 that holds the slide 2 down in place, a rotary-type variable resistor 24, and a base 21B. The base 21B is arranged on the specimen holder body section 21 by screw 21C. The rotary-type variable resistor 24 is arranged on the base 21B by screw 21A. A torque screw 25 that holds the slide 2 down with a constant force is connected to the rotary-type variable resistor 24 via a gear 26. The torque screw 25 holds the slide 2 down with a constant load, but cannot with a load greater than the constant load. In this case, the specimen holder section 21 may omit and directly fixes to the stage 1.

A specimen S composed of a subject 3, a cover glass 4 and the slide 2 is placed on the stage 1 and the slide 2 is fixed in place by the holding metal fittings 22 and hold-down metal fittings 24. The torque screw 25 is turned until its tip has touched the surface of the slide 2 and come to a stop. In this case, the variable resistor 24, too, rotates and its resistance changes with the thickness of the slide 2. Because the resistance value r at that time is sensed by always holding the slide 2 down with a constant pressure, a highly accurate value is obtained.

Next, the operation of the present embodiment will be explained.

When the external controller 15 sends an automatic focusing start signal to the CPU 16, the CPU 16 reads the resistance value r from the variable resistor 24. On the basis of the resistance value r, the CPU 16 computes the thickness t of the slide 2. Data on the magnification of an object lens to be used has been entered in the external controller 15 beforehand.

First, explanation will be given by reference to FIG. 2 where a low magnification object lens 3 whose focal depth is greater than the thickness of the subject 4. It is assumed that the thickness of the slide serving as a reference is t (the thickness t of the reference slide glass 2A has been entered in the CPU 16) in advance. The focal point position of the object lens 3 is a constant distance 1 away from the object lens tube mounting surface. The position is determined to be the reference in-focus position on the top surface of the reference slide glass 2A.

To focus on the top surface of the slide 2 of the specimen, the stage 1 has only to be moved the following distance from the reference in-focus position:

$$\Delta t = t - ts$$

The CPU 16 computes the thickness t of the slide 2 and then Δt and transmits the signal concerning the movement of the stage 1 and the direction of the movement to the driving circuit 17, as shown in FIG, 1. On the basis of the signal, the stage 1 starts to move to the in-focus position. Therefore, high-accuracy focus sensing is done without the adverse effect of dirt contributing to the deterioration of the focus accuracy in automatic focal point sensing with the image processing unit.

Furthermore, because the distance between the tube mounting surface of the object lens 3 and the focal point position is constant, if the stage positions corresponding to the thicknesses have been stored in the CPU 16, the stage 1 can be moved to the in-focus position without setting the thickness of the reference slide in the external controller 15.

When the high magnification object lens 3 is set, since it has only a very small focal depth, it is difficult to determine the in-focus position on the basis of the thickness of the slide 2. However, the focusing zone of the object lens 3 can be determined on the basis of the thickness t of the slide 2. Therefore, focal point sensing can be done at very high speed with high accuracy by performing automatic focal point sensing by means of the image processing unit in the focusing zone obtained on the basis of the thickness t of the slide.

Next, a seventh embodiment of the present invention will be described by reference to FIGS. 9A and 9B.

An automatic focal point sensing apparatus for microscopes according to a seventh embodiment has the same configuration as that of the sixth embodiment.

FIG. 9A is a top view of the specimen holder of the seventh embodiment. FIG. 9B is a side view of the specimen holder of the seventh. The specimen holder body section 21 is provided with holding metal fittings 22 that holds the slide 2, hold-down metal fittings 23 that holds the slide down in place, and a torque screw 25 that holds the slide down with a constant force. The torque screw is provided with a disk-like micrometer 28 graduated in several ten to several hundred microns. The specimen holder body section 21 is provided with a reading unit 29 that reads the micrometer 28. The torque screw 25 holds the slide 2 down with a constant load, but cannot with a load greater than the constant load.

First, with the specimen S not being set, the torque screw 25 is turned until the tip of the screw has touched the slide 2 and come to a stop. The value of the micrometer 28 at that time is read by the external controller 15 and the read value is stored as the reference position. The specimen S composed of a subject 3, a cover glass 4 and the slide is placed on the stage 1 and the slide 2 is fixed in place by the holding metal fittings 21 and hold-down metal fittings 23. The torque screw 25 is turned until its tip has touched the surface of the slide 2 and come to a stop. In this case, the graduated micrometer 28, too, rotates. Because the scale reading at that time is sensed by always holding the slide 2 down with a constant pressure, a highly accurate value is obtained.

Next, when the external controller 15 sends an automatic focusing start signal to the CPU 16, the CPU 16 reads the scale division deviated from the reference position from the reading unit 29 and senses the thickness t of the slide 2. On the basis of the thickness, the CPU 16 computes the movement of the stage 1 and the direction of the movement and sends the signal concerning them to the driving circuit 17. As a result, the stage 1 starts to move to the in-focus position.

Consequently, the seventh embodiment will produce the same effect as the sixth embodiment.

Next, an eighth embodiment of the present invention will be described by reference to FIGS. 10A and 10B.

An automatic focal point sensing apparatus for microscopes according to the fifteenth embodiment has the same configuration as that of the thirteenth embodiment.

Figure 10A:
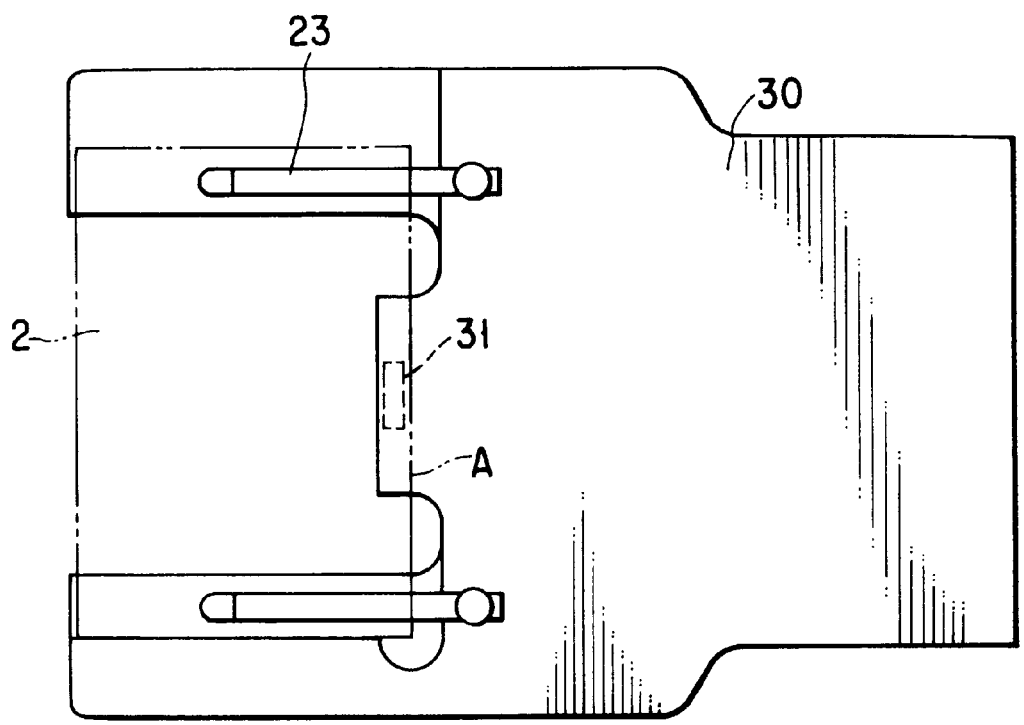
FIG. 10A is a top view of the specimen holder of the eighth embodiment of the present invention.
Figure 10B:
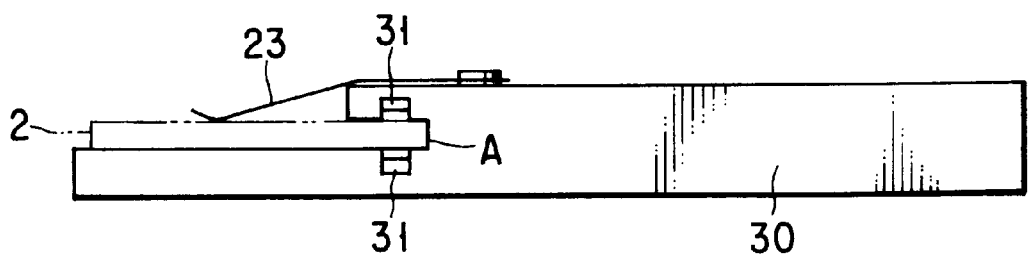
FIG. 10B is a side view of the specimen holder of the eighth embodiment of the present invention.

FIG. 10A is a top view of the specimen holder of the present embodiment. FIG. 10B is a side view of the specimen holder of the present embodiment. The specimen holder body section 30 is provided with hold-down metal fittings 23 that holds a slide 2 down in place. A displacement sensor 31 that projects laser light on the slide 2 and senses the thickness of the slide on the basis of the reflected light is embedded in the specimen holder body section. A specimen S composed of a subject 3, a cover glass 4 and the slide 2 is placed on the stage 1 and is pressed until it has touched the strike position A of the specimen holder body section. At this time, the slide 2 is fixed in place by the hold-down metal fittings 23.

When the external controller 15 sends an automatic focusing start signal to the CPU 16, the CPU 16 reads the thickness of the slide 2 sensed by the displacement sensor 30 embedded in the specimen holder body section 30. The CPU 16 computes the movement of the stage 1 and the direction of the movement and sends the signal concerning them to the driving circuit 17. On the basis of the signal, the stage 1 starts to move to the in-focus position.

Consequently, the eighth embodiment will produce the same effect as the sixth embodiment.

Next, a ninth embodiment of the present invention will be explained by reference to FIG. 11.

Figure 11:
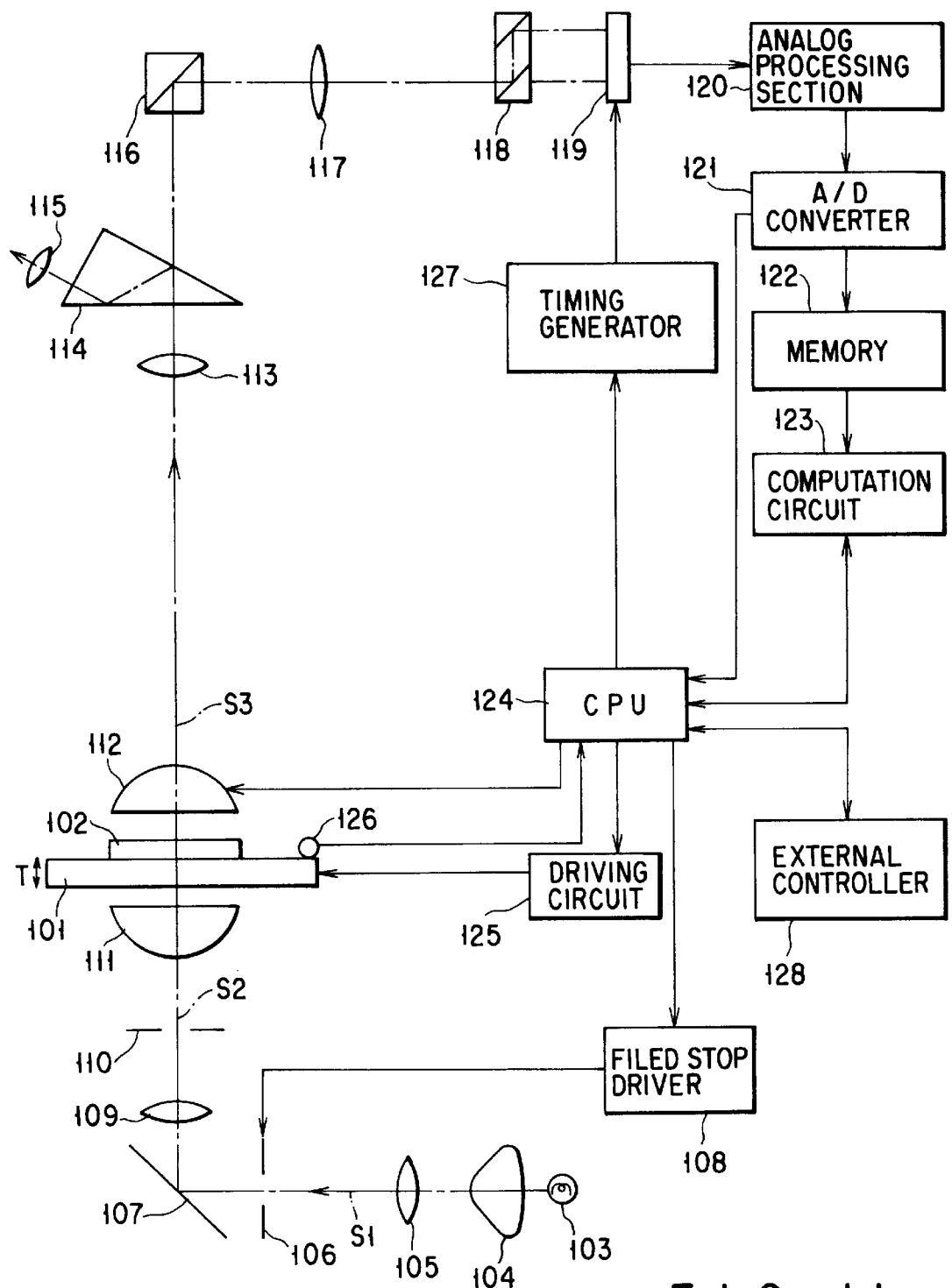
FIG. 11 is a schematic diagram of the optical system of a microscope to which an automatic focal point adjustment apparatus according to a ninth embodiment of the present invention is applied.

FIG. 11 is a schematic diagram of an automatic focus adjustment apparatus where an automatic focus adjustment method of the present invention is applied to a transmission illumination microscope. A specimen 102 is placed on a stage 101 of a microscope. The stage 101 can move up and down in the direction of arrow T. The microscope is provided with an optical system to illuminate the specimen 102.

Specifically, in an optical path $s_1$ of illumination light emitted from a light source 103, there are provided a collector lens 104, a relay lens 105, a field stop 106, and a reflecting mirror 107. The stop size of the field stop 106 is changed by a filed stop driver 108. In the direction of reflection of the reflecting mirror 107, that is, in the optical path $s_2$ of the illumination light directed upward by the reflecting mirror 107, there are provided a relay lens 109, an aperture diaphragm 110, and a condenser lens 111. The condenser lens 111 is used to illuminate the specimen 102 uniformly.

Above the specimen 102, an object lens 112 is positioned so as to face the specimen 102. In the luminous flux $s_3$ from the specimen 102, there are provided an image formation lens 113 and an optical path branch member 114. The optical path branch member 114 directs part of the luminous flux $s_3$ from the specimen 102 to an eyepiece 115 and the remaining part of the luminous flux to a split prism 118 via a mirror 116 and an image formation lens 117. The split prism 118 divides the entering luminous flux in two and sends to a CCD sensor 119 these two luminous fluxes in parallel. The two luminous fluxes from the split prism 118 differ from each other in the length of the optical path from the light-emitting surface of the image formation lens 117 to the light-receiving surface of the CCD sensor 119. The light-receiving surface of the CCD sensor 119 coincides with optically conjugate positions (the front conjugate surface and the back conjugate surface) before and after the intended image formation surface of the image formation optical system including the image formation lens 117. Therefore, on the light-receiving surface of the CCD sensor 119, images of the subject (the front focus image and back focus image) are projected in the two conjugate positions with respect to the intended image formation surface. These two images of the subject take the same shape when the subject is in focus.

In the ninth embodiment, the image of the field stop 106 projected on the specimen 102 is determined to be the subject in automatic focusing control. The CCD 119 outputs analog signals having the voltage level corresponding to the amount of incident light of the projected images (the front focus image and back focus image) and the accumulation time. A memory 122 is connected to the output terminal of the CCD sensor 119 via an analog processing section 120 and an A/D converter 121. The analog processing section 120 has the function of performing an analog process on the analog signal from the CCD sensor 119 in a manner that amplifies and filters the front focus image and back focus image separately. The A/D converter 121 has the function of digitizing the output signal of the analog processing section 120. The memory 122 stores the digitized front focus image signal and back focus image signal from the CCD sensor 119 separately. A computation circuit 123 has the function of reading the two images of the subject stored in the memory 122, that is, the front focus image digital signal and back focus image digital signal, calculating the contrast value between the front focus image and back focus image using the front focus image and back focus image digital signals, and computing from the contrast value the amount of defocus indicating the degree of focusing of the field stop 106, and sending the defocus signal to the CPU 124.

The CPU 124 has the function of taking in the defocus signal obtained at the computation circuit 123, computing on the basis of the defocus signal the movement of the stage 101 and the direction of its movement to bring the image of the field stop 106 to the in-focus position, and sending the signal pertaining to the movement and the direction of movement to the driving circuit 125. The CPU 124 also has the function of taking in the movement of the stage 101 from an encoder 126 at the time when the stage 101 has moved up and down, computing the movement of the stage 101 as the amount of defocus $\Delta a$ of the image of the field stop 106, obtaining the thickness t of the specimen 102 on the basis of the amount of defocus $\Delta a$, and finding the movement of the stage 101 on the basis of the difference $\Delta Z$ between the thickness t of the specimen 102 and the thickness $t_0$ of the reference specimen. The encoder 126 has the function of generating a pulse signal corresponding to the movement of the stage 101 and outputs the pulse signal as the movement signal of the stage 101.

The driving circuit 125 has the function of taking in the signal regarding the movement and the direction of movement sent from the CPU 124 and making a focus adjustment by moving the stage 101 up and down in the direction of arrow T on the basis of the signal regarding the movement and the direction of movement. The CPU 124 also has the function of monitoring via the A/D converter 121 whether or not the analog signal concerning the image of the subject outputted from the CCD sensor 119 is compatible with the range of the analog processing section 120 and, when the analog signal concerning the image of the subject is not compatible with the range of the analog processing section 120, sending to a timing generator 127 an instruction to change the charge accumulation time at the CCD sensor 119 to an accumulation time compatible with the range. The timing generator 127 sends a read timing signal to the CCD sensor 119 and has the function of receiving the instruction from the CPU 124, changing the charge accumulation time to the one specified by the instruction, and sending a read timing signal to the CCD sensor 119. An external controller 128 is connected to the CPU 124. The external controller 128 has the function of providing start and stop control of automatic focusing and enabling the observer to specify the magnification of the object lens 112 and others.

Figure 12:
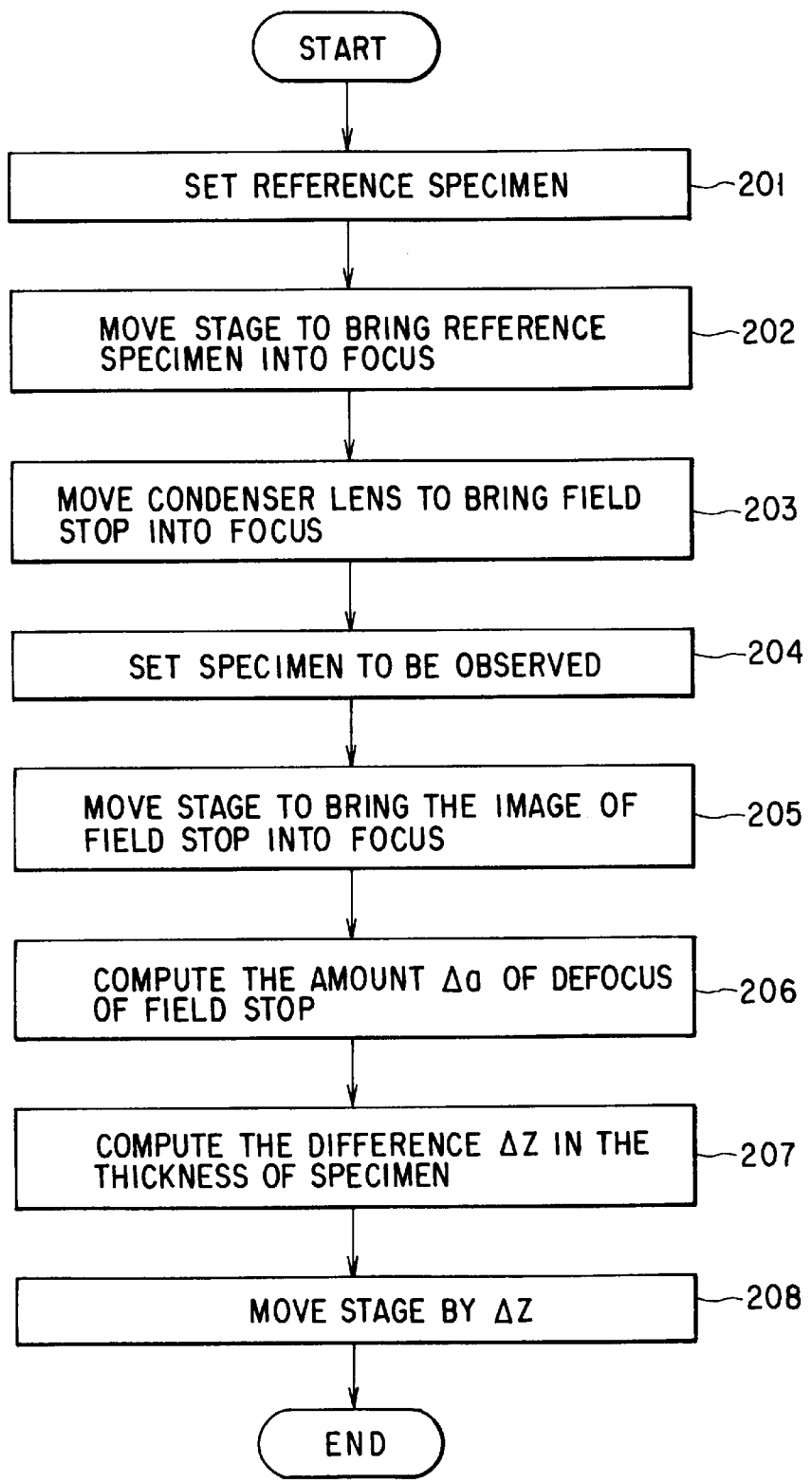
FIG. 12 is a flowchart to help explain the operation procedure of automatic focus adjustment in the ninth embodiment.

The operation of the apparatus thus constructed will be described by reference to the operation procedure shown in FIG. 12. At step 201, a reference specimen 102s is placed on the stage 101. The reference specimen 102s is generally formed of a slide with a refractive index of $n_s$ to a thickness of $t_0$. The illumination light emitted from the light source 103 passes through the collector lens 104, relay lens 105, and field stop 106, and reaches the reflecting mirror 107, which reflects the light upward. The reflected light passes through the relay lens 109 and aperture diaphragm 110 and reaches the condenser lens 111, which illuminates the specimen 102s uniformly. The luminous flux $s_3$ from the specimen 102s passes through the object lens 112 and image formation lens 113 and reaches the optical path branch member 114. The optical path branch member 114 directs part of the luminous flux $s_3$ from the specimen 102s to the eyepiece 115 and the remaining luminous flux to the split prism 118 via the image formation lens 117. The split prism 118 divides the incident luminous flux in two and sends to the CCD 119 these two luminous fluxes in parallel.

The CCD sensor 119 outputs an analog signal having the voltage level corresponding to the amount of incident light of the projected images (the front focus image and back focus image) and the accumulation time. The analog processing section 120 performs an analog process on the analog signal outputted from the CCD sensor 119 in a manner that amplifies and filters the front focus image and back focus image separately. The output signal of the analog processing section 120 is digitized by the A/D converter 121. The digitized signal is sent to the memory 122, which stores the front focus image and back focus image separately. The computation circuit 123 reads the front focus image and back focus image digital signals stored in the memory 122, calculates the contrast value between the front focus image and back focus image using the front focus image and back focus image digital signals, and computes from the contrast value the amount of defocus indicating the degree of focusing of the field stop 106. The CPU 124 takes in the defocus signal obtained at the computation circuit 123, computes on the basis of the defocus signal the movement of the stage 101 and the direction of its movement to bring the image of the field stop 106 to the in-focus position, and sends the signals pertaining to the movement and the direction of movement to the driving circuit 125.

As a result, the stage 101 moves up and down at step 202. When the front focus image and back focus image that are projected on the light-receiving surface of the CCD sensor 119 take the same shape, the image of the field stop 106 is in the in-focus position. At step 203, the image of the field stop 106 is focused on the reference specimen 102s by moving the condenser lens 111 up and down.

Figure 13:
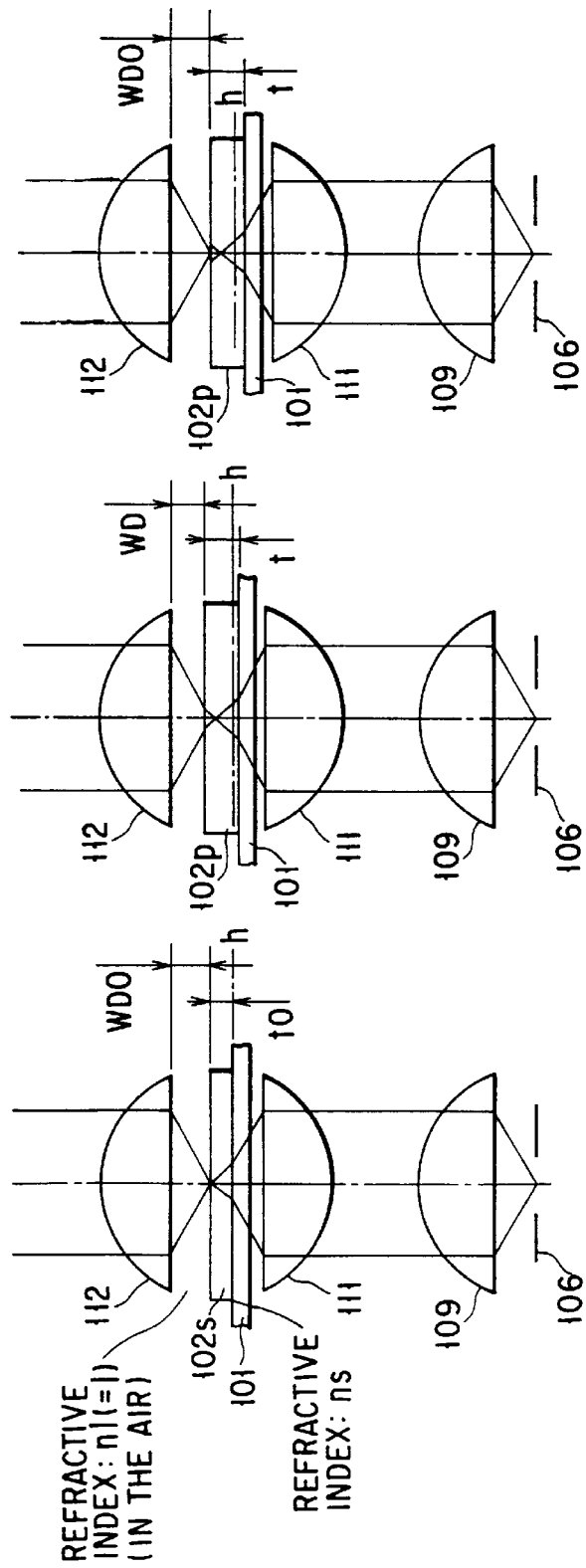
FIGS. 13A to 13C are diagrams to help explain the operation of automatic focus adjustment in the ninth embodiment.

FIG. 13A shows the state where with the reference specimen 102s on the stage 101, the focal point position of the object lens 112 with the moving distance WD coincides with the image of the field stop 106 formed when the illumination light passes through the field stop 106 and relay lens 109 and is projected by the condenser lens 111 on the reference specimen 102s. In the figure, h indicates the top surface position of the table 101. The position in which the focal point of the object lens 112 coincides with the image of the field stop 106 is determined to be the reference in-focus position.

Next, at step 204, in place of the reference specimen 102s, a specimen to be observed (a specimen to be measured) 102p is placed on the stage 101. The specimen 102p is formed so as to have a refractive index $n_s$ and a thickness of t, for example. When the specimen 102p is placed on the stage 1, the change in the thickness t of the specimen 102p results in a change in the distance between the focal point position of the object lens 112 and the image of the field stop 106. At this time, only when the specimen 102p is thicker than the reference specimen 102s, the focal point position of object lens 112 changes. The position of the image of the field stop changes with the thickness of the specimen. In this state, the luminous flux $s_3$ from the specimen 102p being observed passes through the object lens 112 and image formation lens 113 and reaches the optical path branch member 114 as described earlier. The optical path branch member 114 directs part of the luminous flux $s_3$ from the specimen 102p to the eyepiece 115 and the remaining luminous flux to the split prism 118 via the mirror 116 and image formation lens 117. The luminous flux from the specimen 102p is divided by the split prism 118 in two. The two parallel luminous fluxes are projected on the CCD sensor 119. The CCD sensor 119 then outputs the analog signals having the voltage level corresponding to the amount of incident light of the projected images (the front focus image and back focus image) and the accumulation time. The front focus image and back focus image analog signals are subjected to an analog process separately at the analog processing section 120. The resulting signals are digitized by the A/D converter 121. The digitized signals are stored in the memory 122. The computation circuit 123 calculates the contrast value between the front focus image and back focus image using the front focus image and back focus image digital signals stored in the memory 122, and computes from the contrast value the amount of defocus indicating the degree of focusing of the field stop 106.

In sensing the amount of defocus, the CPU 124 sends a signal indicating the size of a specific stop to the field stop driver 108 so that the image of the field stop 106 can be recognized. The field stop 106 at that time is stopped down to a predetermined fixed stop value. Alternatively, a table in which the magnifications of the object lens 112 correspond to the stop values of the field stop 106 is prepared in advance and the stop value corresponding to the object lens 112 used is read out. Then, the field stop 106 is stopped down to the read-out stop value. When the field stop 106 is stopped down to the determined fixed value, the field stop may be set to a value that can be sensed with the object lens 112 with the maximum possible magnification. After the amount of defocus has been sensed, the stop value of the field stop 106 returns to the original stop value.

At step 205, the CPU 124 calculates the movement of the stage 101 and the direction of its movement on the basis of the defocus signal from the computation circuit 123 and sends the signal concerning the movement and the direction of movement to the driving circuit 125. As a result, the stage 101 moves up and down. When the front focus image and back focus image that are projected on the light-receiving surface of the CCD sensor 119 take the same shape, the image of the field stop 106 is in the in-focus position as shown in FIG. 13B. At this time, the encoder 126 senses the movement Δa of the stage 101 and the movement signal is sent to the CPU 124.

At step 206, the CPU 124 takes in the movement signal from the encoder 126, determines the movement Δa of the stage 101 to be the amount of defocus Δa of the field stop 106, and calculates the thickness t of the specimen 102p on the basis of the amount of defocus Δa. Specifically, if the thickness of the reference specimen 102s is $t_0$, the moving distance of the object lens 112 is $WD_0$, and the moving distance of the object lens 112 for the specimen 102p to be observed is WD, this will give:

$$t_0 + WD_0 + \Delta a = t + WD \tag{4}$$

$$WD_0 = WD + (t-t_0)/n_s \tag{5}$$

From equation (4) and equation (5), the thickness t of the specimen 102p is expressed as:

$$t = t_0 + \Delta a/(1 - 1/n_s) \tag{6}$$

In this way, the thickness t of the specimen 102p is found by sensing the amount Δa of defocus of the image of the field stop 106.

Next, at step 207, the CPU 124 calculates the difference ΔZ between the thickness t of the specimen 102p and the thickness $t_0$ of the reference specimen 102s and determines the difference to be the movement ΔZ of the stage 101. Specifically, the difference ΔZ between the thickness t of the specimen 102p and the thickness $t_0$ of the reference specimen 102s is expressed as:

$$\Delta Z = t - t_0 \tag{7}$$

Substituting equation (6) gives:

$$\Delta Z = \Delta a/(1 - 1/n_s) \tag{8}$$

At step 208, the CPU 124 determines the difference ΔZ between the thickness t of the specimen 102p and the thickness $t_0$ of the reference specimen 102s to be the movement ΔZ of the stage 101 and sends the movement together with the direction of movement to the driving circuit 125 again. As a result, the stage 101 moves up and down so as to be focused on the specimen 102p as shown in FIG. 13C.

As described above, with the ninth embodiment, the image of the field stop 106 is projected as a marker image on the specimen 102p to be observed, the amount of defocus Δa between the image of the field stop 106 and the reference in-focus position is sensed, the thickness t of the specimen 102p is found on the basis of the amount of defocus Δa, and the movement of the stage 101 is calculated on the basis of the difference ΔZ between the thickness t of the specimen 102p and the thickness $t_0$ of the reference specimen 102s. Therefore, even when deposits, such as dirt, adhere to the slide on which the specimen 102 is placed, the cover glass, or the condenser lens 111, because the image of field stop 106 has a higher contrast than deposits, such as dirt, and the shape of the image of the field stop 106 is already known, it is possible to make an automatic focal point adjustment with respect to the specimen 102 with high accuracy using only the image of the field stop 106. Moreover, the image processing of the image of the field stop 106, an image having a specific shape, eliminates complicated image processing, which achieves a low-cost automatic focal point adjustment apparatus for use in a microscope.

Figure 14:
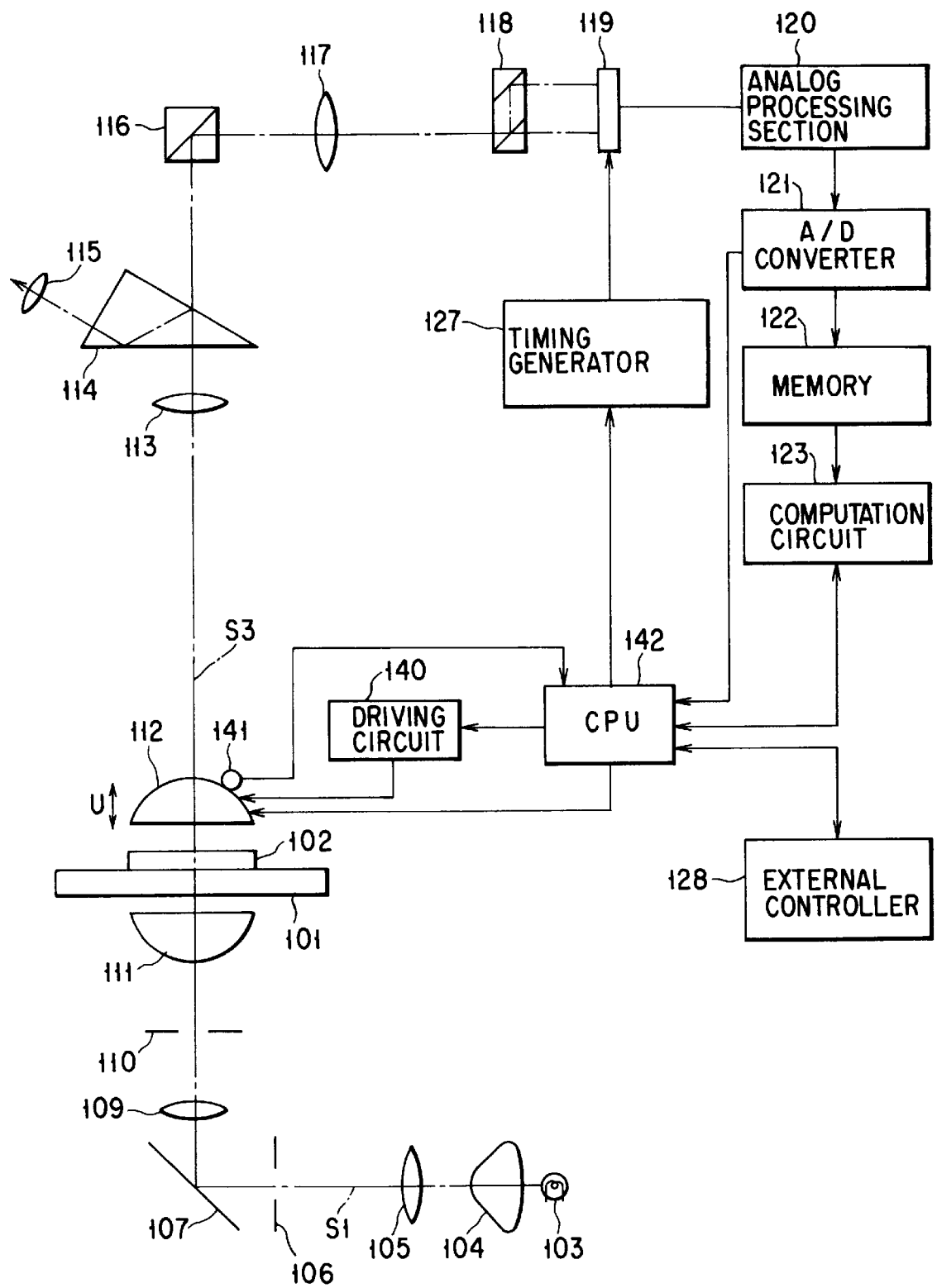
FIG. 14 is a schematic diagram of a tenth embodiment of the present invention.

Next, a tenth embodiment of the present invention will be explained. FIG. 14 is a schematic diagram of an automatic focus adjustment apparatus applied to a microscope having a transmission illumination optical system. In FIG. 14, the same parts as those in FIG. 11 are indicated by the same reference symbols and a detailed explanation of them will not be given. An object lens 112 is provided so as to be moved up and down in the direction of arrow U by means of a driving circuit 140. An encoder 141 has the function of generating a pulse signal corresponding to the movement of the object lens 112 and outputting the pulse signal as the movement signal of the object lens 112. A CPU 142 has the function of receiving from the encoder 141 the movement of the object lens 112 obtained when the object lens 112 has moved up and down, determining the movement of the object lens 112 to be the amount of defocus Δa of the field stop 106, calculating the thickness t of the specimen 102 on the basis of the amount of defocus Δa, and finding the movement of the object lens 112 on the basis of the difference ΔZ between the thickness t of the specimen 102 and the thickness $t_0$ of the reference specimen.

Next, the operation of the apparatus thus constructed will be explained referring to FIG. 15A. A reference specimen 102s is placed on the stage 101. The reference specimen 102s is generally formed of a slide with a refractive index of $n_s$ to a thickness of $t_0$. The illumination light emitted from the light source 103 passes through a collector lens 104, a relay lens 105, and a field stop 106, and reaches a reflecting mirror 107, which reflects the light upward. The reflected light passes through a relay lens 109 and an aperture diaphragm 110 and reaches a condenser lens 111, which illuminates the specimen 102s uniformly. The luminous flux $s_3$ from the specimen 102s passes through the object lens 112 and image formation lens 113 and reaches an optical path branch member 114. The luminous flux further passes through a mirror 116 and an image formation lens 117 and is directed to a split prism 118, which divides the flux into two parallel luminous fluxes, which then enter a CCD sensor 119.

From now on, as the tenth embodiment, the CCD sensor 119 outputs an analog signal having the voltage level corresponding to the amount of incident light of the projected images (the front focus image and back focus image) and the accumulation time. An analog processing section 120 performs an analog process, including amplification, on the analog signal. The front focus image and back focus image digital signals are stored in a memory 122 separately. Using the front focus image and back focus image digital signals stored in the memory 122, the computation circuit 123 computes from the contrast value between the two images the amount of defocus indicating the degree of focusing of the field stop 106. On the basis of the defocus signal from the computation circuit 123, the CPU 142 computes the movement of the object lens 112 and the direction of its movement to bring the image of the field stop 106 to the in-focus position, and sends the signal pertaining to the movement and the direction of movement to the driving circuit 140.

As a result, the object lens 112 moves up and down. When the front focus image and back focus image that are projected on the light-receiving surface of the CCD sensor 119 take the same shape, the image of the field stop 106 is in the in-focus position. Furthermore, the image of the field stop 106 is focused on the reference specimen 102s by moving the condenser lens 111 up and down.

Figures 15A, 15B, 15C:
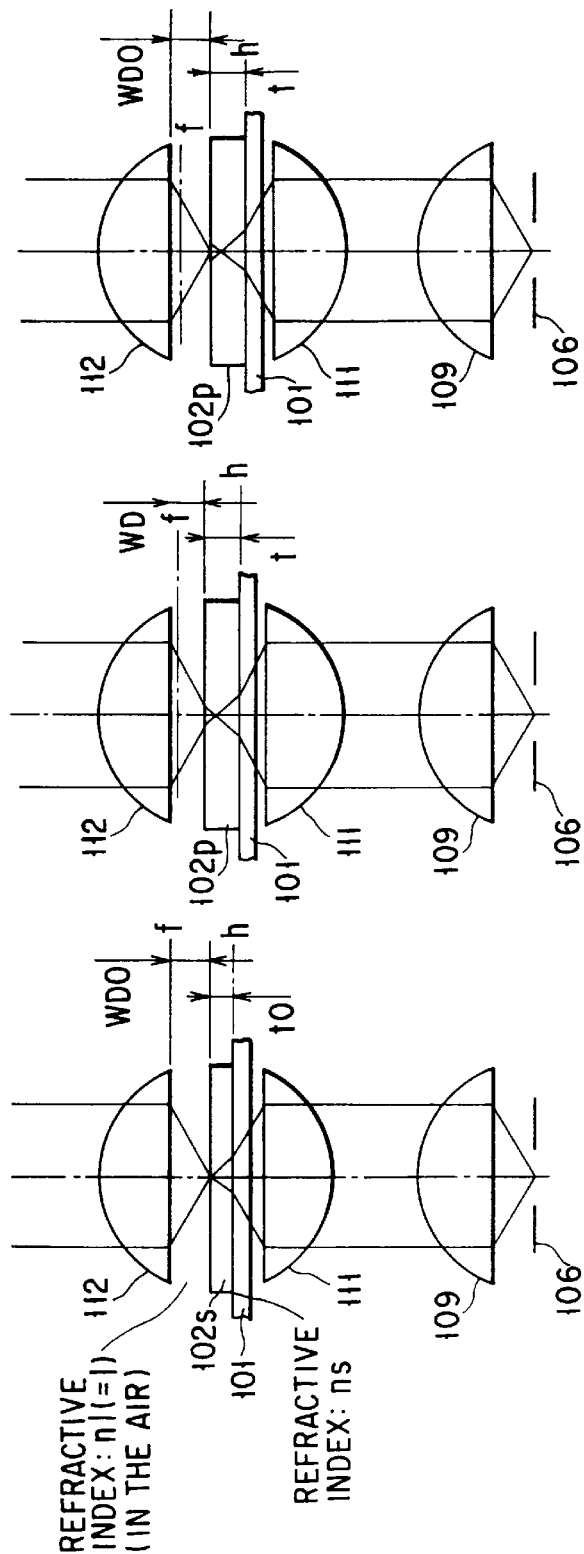
FIGS. 15A to 15C are diagrams to help explain the operation of automatic focus adjustment in the tenth embodiment.

FIG. 15A shows the state where with the reference specimen 102s on the stage 101, the focal point position of the object lens 112 with the moving distance $WD_0$ coincides with the image of the field stop 106 formed when the illumination light passes through the field stop 106 and relay lens 109 and is projected by the condenser lens 111 on the reference specimen 102s. That is, FIG. 15A shows the reference in-focus position. In the figure, f indicates the bottom surface position of the object lens 112.

Next, in place of the reference specimen 102s, a specimen to be observed 102p is placed on the stage 101. The specimen 102p is formed so as to have a refractive index $n_s$ and a thickness of t, for example. When the specimen 102p is placed on the stage 101, the change in the thickness t of the specimen 102p results in a change in the distance between the focal point position of the object lens 112 and the image of the field stop 106 as shown in FIG. 15B. In this state, the luminous flux $s_3$ from the specimen 102p being observed passes through the object lens 112 and image formation lens 113, optical path branch member 114, mirror 116, and image formation lens 117 and is directed to the split prism 118 and thereafter is projected to the CCD sensor 119 as described earlier. The CCD sensor 119 then outputs the analog signals having the voltage level corresponding to the amount of incident light of the front focus image and back focus image and the accumulation time. The analog signals are digitized. The digitized signals are stored in the memory 122. Using the front focus image and back focus image digital signals stored in the memory 122, the computation circuit 123 computes from the contrast value between the two images the amount of defocus indicating the degree of focusing of the field stop 106. On the basis of the calculated defocus signal, the CPU 142 calculates the movement of the object lens 112 and the direction of its movement and sends the signal concerning the movement and the direction of movement to the driving circuit 140.

As a result, the object lens 112 moves up and down. When the front focus image and back focus image that are projected on the light-receiving surface of the CCD sensor 119 take the same shape, the image of the field stop 106 is in the in-focus position. At this time, the encoder 141 senses the movement Δa of the object lens 112 and sends the movement signal to the CPU 142. The CPU 142 takes in the movement signal from the encoder 141, determines the movement Δa of the object lens 112 to be the amount of defocus Δa of the image of the field stop 106, and calculates the thickness t of the specimen 102p on the basis of the amount of defocus Δa. Specifically, if the thickness of the reference specimen 102s is $t_0$, the moving distance of the object lens 112 is $WD_0$, and the moving distance of the object lens 112 for the specimen 102p to be observed is WD, the thickness t of the specimen 102p will be determined from equation (4) to equation (6) as follows:

$$t = t_0 + \Delta a/(1 - 1/n_s) \quad (9)$$

Next, the CPU 142 calculates the difference ΔZ between the thickness t of the specimen 102p and the thickness $t_0$ of the reference specimen 102s and determines the difference to be the movement ΔZ of the object lens.

Specifically, the difference ΔZ between the thickness t of the specimen 102p and the thickness $t_0$ of the reference specimen 102s is given from equation (7) and (8):

$$\Delta Z = \Delta a/(1 - 1/n_s) \quad (10)$$

The CPU 142 determines the difference ΔZ between the thickness t of the specimen 102p and the thickness to of the reference specimen 102s to be the movement ΔZ of the object lens 112 and sends the movement together with the direction of movement to the driving circuit 140 again.

As a result, the object lens 112 moves up and down so as to be focused on the specimen 102p as shown in FIG. 15C.

As described above, with the seventh embodiment, the image of the field stop 106 is projected on the specimen 102p to be observed, the amount of defocus Δa between the image of the field stop 106 and the reference in-focus position is sensed, the thickness t of the specimen 102p is found on the basis of the amount of defocus Δa, and the movement of the object lens 112 is calculated on the basis of the difference ΔZ between the thickness t of the specimen 102p and the thickness $t_0$ of the reference specimen. Consequently, it goes without saying that the tenth embodiment produces the same effect as the ninth embodiment.

Next, an eleventh embodiment of the present invention will be explained by reference to FIG. 16. FIG. 16 is a schematic diagram of an automatic focal point adjustment apparatus applied to a microscope with a transmission illumination optical system. In FIG. 16, the same parts as those in FIG. 11 are indicated by the same reference symbols and a detailed explanation of them will not be given. In the optical path $s_1$ of illumination light emitted from a light source 103, there are provided a collector lens 104, a relay lens 105, a field stop 106, and a half mirror 150. In the direction of reflection of the half mirror 150, that is, in the optical path $s_2$ of the illumination light directed upward by the half mirror 150, there are provided a relay lens 109, an aperture diaphragm 110, and a condenser lens 111. The condenser lens 111 is used to illuminate the specimen 102 uniformly.

There is provided an index light source 151, which is turned on by the light-up control signal sent from an index light source driver 152. In the optical path (which coincides with the optical path $s_2$ of the illumination light) of the index light emitted from the index light source 151, an index plate 153 is provided. The index plate 153 is placed in the conjugate position with respect to the field stop 106. A computation circuit 154 has the function of obtaining only the signal of the index plate 153 from the deviation of the output signal of the CCD sensor 119 concerning the observed specimen 102p from the output signal of the CCD sensor 119 concerning the reference specimen 102s stored in the memory 122. The computation circuit 154 has the function of reading the digital signals of the front focus image and back focus image of the index plate 153 stored in the memory 122, calculating the contrast value between the front focus image and back focus image using the front focus image and back focus image digital signals, and computing from the contrast value the amount of defocus indicating the degree of focusing of the index plate 153.

The CPU 155 has the function of taking in the defocus signal from the computation circuit 154, computing on the basis of the defocus signal the movement of the stage 101 and the direction of its movement to bring the image of the index plate 153 to the in-focus position, and sending the signal pertaining to the movement and the direction of movement to the driving circuit 125. The CPU 155 also has the function of taking in the movement of the stage 101 from an encoder 126 obtained when the stage 101 has moved up and down, computing the movement of the stage 101 as the amount of defocus Δa of the image of the index plate 153, obtaining the thickness t of the specimen 102p on the basis of the amount defocus Δa, and finding the movement of the stage 101 on the basis of the difference between the thickness t of the specimen 102p and the thickness $t_0$ of the reference specimen. A timing generator 156 has the function of sending a read timing signal to the CCD sensor 119 on the basis of the timing signal from the CPU 155. An index light source driver 152 has the function of providing light-up control by sending a light-up control signal to the index light source 151 on the basis of the timing signal from the CPU 155.

Next, the operation of the apparatus thus constructed will be explained referring to FIG. 16. A reference specimen 102s is placed on the stage 101. The illumination light emitted from the light source 103 passes through the collector lens 104, relay lens 105, and field stop 106, and reaches the half mirror 150, which reflects the light upward. The reflected light passes through the relay lens 109 and aperture diaphragm 110 and reaches the condenser lens 111, which illuminates the reference specimen 102s uniformly. The luminous flux $s_3$ from the reference specimen 102s passes through the object lens 112 and image formation lens 113 and reaches the optical path branch member 114. The luminous flux further passes the mirror 116 and image formation lens 117 and is directed to the split prism 118, which divides the flux into two parallel fluxes, which then enter the CCD sensor 119.

Figure 17:
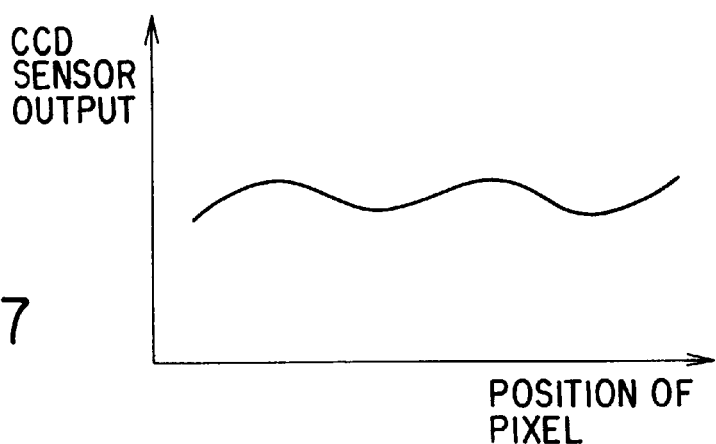
FIG. 17 shows the output of the CCD sensor when no index image is projected on the specimen.

The CCD sensor 119 outputs an analog signal having the voltage level corresponding to the amount of incident light of the projected images and the accumulation time. The analog signals are subjected to amplification and filtering at the analog processing section 120. The resulting signals are digitized by the A/D converter 121. Here, the digitized signals are stored in the memory 122. The digital output signals from the CCD sensor 119 stored in the memory 122 are obtained by projecting only the illumination light on the reference specimen 102s, whose waveform is shown in FIG. 17, for example. Next, when the index light source 151 is turned on, the index light emitted from the index light source 151 passes through the index plate 153 and forms an index image. The index image passes through the half mirror 150, relay lens 109, and aperture diaphragm 110, and reaches the condenser lens 111, which projects the image on the reference specimen 102s. The luminous flux $s_3$ from the reference specimen 102s on which the index image has been projected passes through the object lens 112 and image formation lens 113, and reaches the optical path branch member 114. The luminous flux further passes through the mirror 116 and image formation lens 117, and is directed to the split prism 118, which divides the flux into two parallel fluxes, which then enter the CCD sensor 119.

Figure 18:
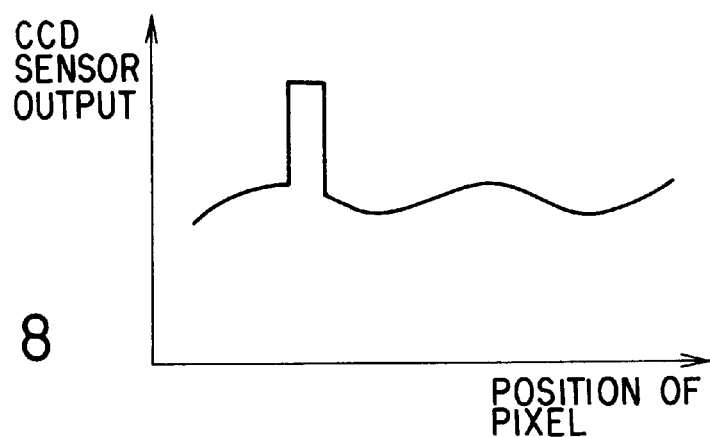
FIG. 18 shows the output of the CCD sensor when the index image is projected on the specimen.
Figure 19:
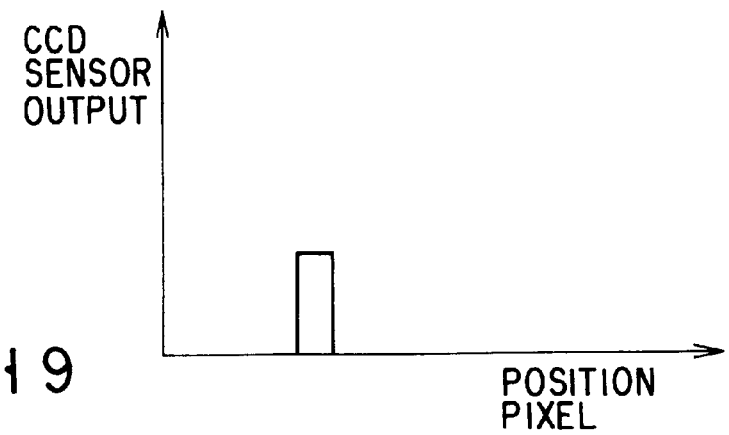
FIG. 19 shows the output of the CCD sensor when only the index image is present.

The CCD sensor 119 outputs an analog signal having the voltage level corresponding to the amount of incident light of the image including the index image and the accumulation time. The analog signal is subjected to amplification and filtering at the analog processing section 120. The resulting signal is digitized by the A/D converter 121. Here, the digitized signal is stored in the memory 122. The digital output signal from the CCD sensor 119 stored in the memory 122 is obtained by projecting the index image on the reference specimen 102s, whose waveform is shown in FIG. 18, for example. The computation circuit 154 finds the signal of only the index image shown in FIG. 19 from the deviation of the output signal of the CCD sensor 119 when the index image is projected on the reference specimen 102s stored in the memory 122 from that when not. Here, because the index image striking the CCD sensor 119 is divided by the split prism 118 into two parallel fluxes, they form the front focus image and back focus image of the index image.

The computation circuit 154 reads the front focus image and back focus image digital signals of the index image, calculates the contrast value between the front focus image and back focus image using the front focus image and back focus image digital signals, and computes from the contrast value the amount of defocus indicating the degree of focusing of the index plate 153. The CPU 124 takes in the defocus signal from the computation circuit 154, computes on the basis of the defocus signal the movement of the stage 101 and the direction of its movement to bring the image of the index plate 153 to the in-focus position, and sends the signal pertaining to the movement and the direction of movement to the driving circuit 125.

As a result, the stage 101 moves up and down. When the front focus image and back focus image that are projected on the light-receiving surface of the CCD sensor 119 take the same shape, the index image is in focus. Next, in place of the reference specimen 102s, a specimen to be observed 102p is placed on the stage 101. When the specimen 102p is placed on the stage 101, the change in the thickness t of the specimen 102p results in a change in the distance between the focal point position of the object lens 112 and the image of the index image. The digital output signal of the CCD sensor 119 when the index image is projected on the specimen 102p to be observed and that when not are stored in the memory 122. The computation circuit 154 obtains the signal of only the index image from the deviation of the output signal of the CCD sensor 119 when the index image is projected on the specimen 102p stored in the memory 122 from that when not.

Next, the computation circuit 154 reads the front focus image and back focus image digital signals of the index image, calculates the contrast value between the front focus image and back focus image using the front focus image and back focus image digital signals, and computes from the contrast value the amount of defocus indicating the degree of focusing of the index plate 153. The CPU 124 takes in the defocus signal from the computation circuit 154, computes on the basis of the defocus signal the movement of the stage 101 and the direction of its movement to bring the image of the index plate 153 to the in-focus position, and sends the signal pertaining to the movement and the direction of movement to the driving circuit 125.

As a result (referring to FIG 16), the stage 101 moves up and down so that the index image projected on the specimen 102p may be in the in-focus position. At this time, the encoder 126 senses the movement Δa of the stage 101 and sends the movement signal to the CPU 155. The CPU 155 then takes in the movement signal from the encoder 126, determines the movement Δa of the stage 101 to be the amount of defocus Δa of the index image, and calculates the thickness t of the specimen 102p on the basis of the amount of defocus Δa using equation (1) to equation (3).

Next, the CPU 155 computes the difference ΔZ between the thickness t of the specimen 102p and the thickness $t_0$ of the reference specimen 102s using equation (4) and equation (5). Then, the CPU 142 determines the difference ΔZ between the thickness t of the specimen 102p and the thickness $t_0$ of the reference specimen 102s to be the movement ΔZ of the stage 101 and sends the movement together with the direction of movement to the driving circuit 125 again.

This causes the stage 101 to move up and down so that the specimen 102p may be in focus.

As described above, with the eleventh embodiment, the index image is projected on the specimen 102p to be observed, the amount of defocus Δa between the index image and the reference in-focus position is sensed, the thickness t of the specimen 102p is found on the basis of the amount of defocus Δa, and the movement of the stage 101 is obtained on the basis of the difference ΔZ between the thickness t of the specimen 102p and the thickness $t_0$ of the reference specimen 102s. Therefore, the eleventh embodiment not only produces the same effect as the ninth embodiment, but also need not adjust the stop of the field stop 106.

Next, the other embodiment of the present invention will be explained by reference to FIG. 20. FIG. 20 is a schematic diagram of an automatic focal point adjustment apparatus applied to a microscope with a transmission illumination optical system. In FIG. 20, the same parts as those in FIG. 11 are indicated by the same reference symbols and a detailed explanation of them will not be given. The microscope of FIG. 20 is capable of changing the observation magnification of the object lens. In the optical path $s_1$ of the illumination light emitted from a light source 103, there are provided a collector lens 104, a field stop (FS) 106, and a reflecting mirror 107. In the optical path $s_2$ of the illumination in the direction of reflection of the reflecting mirror 107, there are provided a relay lens 109, an aperture diaphragm 110, and a condenser lens 111a and its front lens 111b (condenser lens 111). In the luminous flux $s_3$ from the specimen 102, for example, the object lens 161a of a plurality of object lenses 161a and 161b provided on a revolver 160 is inserted.

The revolver 160 is designed to insert or remove one of the plurality of object lenses 161a, 161b driven by a revolver driving unit 162, into or from the luminous flux $s_3$. The CPU 124 drives a condenser lens driving unit 163 according to the magnification and NA (numerical aperture) of the object lens 161a or 161b inserted in the luminous flux $s_3$, which inserts or removes the front lens llb of the condenser lens 111 into or from the optical path $s_2$ of illumination light to change the focal length of the condenser lens 111, thereby projecting suitable illumination on the specimen 102.

A detailed explanation of the illumination optical system including the optical paths $s_1$ and $s_2$ of illumination light will be given by reference to FIG. 21. The illumination light emitted from the light source 103 is gathered by the collector lens 104 and relay lens 109. Then, the image of the light source 103 is projected on the surface of the aperture diaphragm 110 in the entrance pupil position of the condenser lens 111.

On the other hand, the illumination light emitted from the light source 103 and passing through the contact lens 104 is projected from the field stop 106 on the reflecting mirror 107. The illumination light reflected by the mirror 107 is made parallel light at the relay lens 109. The parallel light is gathered by the condenser lens 111 on the surface of the specimen 102. That is, the condenser lens 111 serves as an image formation lens for projecting the field stop 106 on the surface of the specimen 102. To illuminate a wide visual field with a low magnification object lens by changing, for example, the object lenses 161a and 161b, the projection magnification of the field stop 106 must be made larger by making the focal length of the condenser lens 111 longer.

When the position of the aperture diaphragm 110 acting as the entrance pupil of the condenser lens is kept unchanged and the back focal point position serving as the projection surface of the field stop 106 is kept on the surface of the specimen 102, it is difficult to change only the focal length. If possible, the number of lenses used is large, making the apparatus expansive.

For this reason, by removing the front lens $111_b$ of the condenser lens 111 from the optical path $s_2$ as shown in FIG. 22, the focal length of the condenser lens 111 is made longer. With this approach, however, complete Köhler illumination cannot be kept and the field stop 106 is often not projected on the surface of the specimen 102. This is not limited to the case where a single condenser lens is used to provide the optimum illumination for low magnification object lenses to high magnification ones. For instance, in the case of the optimum illumination for very low magnification object lenses, such as 1×object lenses, the focal length of the condenser lens gets longer, which makes the condenser lens closer to the relay lens 109 and reflecting lens 107, with the result that the field stop 106 is often not projected on the surface of the specimen 102 because of spatial restrictions. As a result, even when automatic focus adjustment is made by sensing the contrast of the image (FS image) of the field stop 106, the image of the field stop 106 cannot be focused on the surface of the specimen 102.

Hereinafter, a twelfth embodiment of the present invention will be explained which can perform automatic focal point adjustment by sensing the contrast, even when the image of the field stop 106 cannot be projected on the surface of the specimen 102 for the above-described reason. FIG. 23 is a schematic diagram of an automatic focal point adjustment apparatus applied to a microscope with a transmission illumination optical system. In FIG. 23, the same parts as those in FIG. 20 are indicated by the same reference symbols and a detailed explanation of them will not be given. The automatic focal point adjustment method of the present invention is such that when the focal length of the condenser lens 111 is changed according to the observation magnification of the object lens 161a or 161b as shown in FIG. 23 and FIG. 24, a focus adjustment index 170 is placed in the position conjugate to the specimen 102 with respect to the condenser lens 111.

Figure 24:
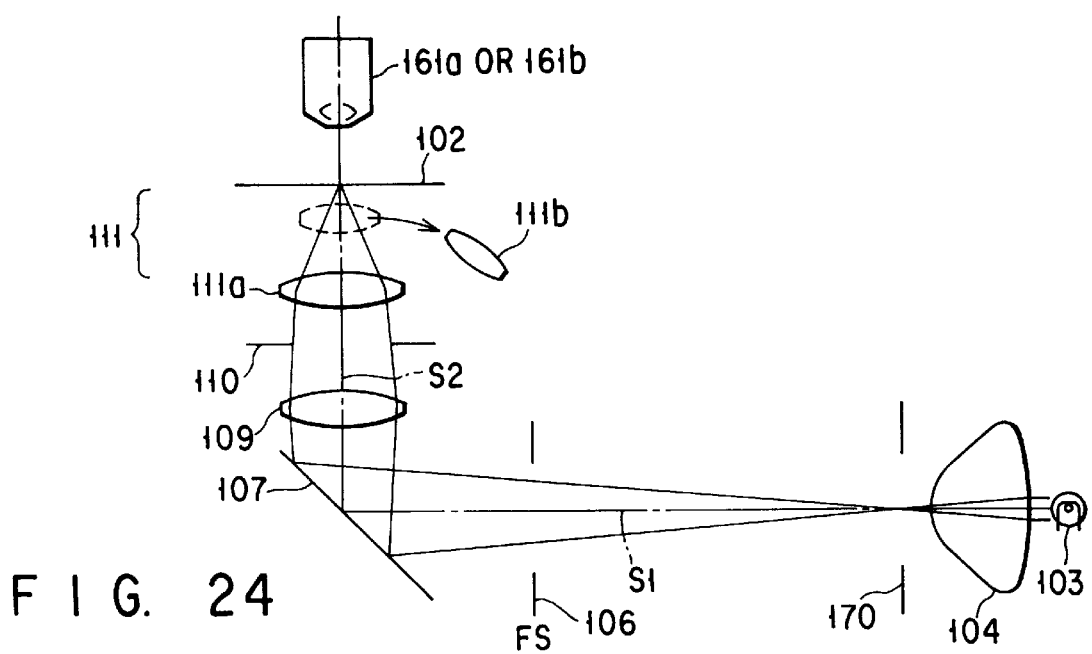
FIG. 24 shows the configuration of the transmission illumination optical system with the front lens of the condenser lens removed under low-magnification object lens illumination.

FIG. 24 is a schematic diagram of the transmission illumination optical system including the condenser lens lila, with the front lens 111b of the condenser lens removed from the optical path $s_2$ during low magnification object lens illumination in the microscope. With the front lens 111b of the condenser lens inserted in the optical path $s_2$, the image of the field stop 106 is projected on the surface of the specimen 102. When the front lens 111b is removed from the optical path $s_2$, the focal length of the condenser lens 111 gets longer and the image of the field stop 106 is projected above the specimen 102, that is, on the side of the object lens 161a or 161b, but not on the surface of the specimen 102. With the front lens 111b removed from the optical path $s_2$, the focal length of the condenser lens 111 is longer, with the result that the conjugate surface to the specimen 102 is located closer to the collector lens 104 than the field stop 106.

Therefore, when the index 170 is placed in the conjugate position to the specimen 102, the image of the index 170 is projected on the surface of the specimen 102. Automatic focus adjustment can be made by sensing the contrast of the image of the index 170, which focuses the image of the index on the specimen 102. Even when the index 170 takes a form projected on the periphery of the visual field of the specimen 102, such as a circle, and the front lens 111b is inserted in the optical path $s_2$ to use the condenser lens 111 for high magnification object lens illumination, the effective rays of light for illumination will not be eclipsed or shaded by the index 170. Even with the front lens 111b removed from the optical path $s_2$, when the image of the index 170 is projected at an observation magnification at which the image of the index covers the CCD sensor 119 for automatic focal point adjustment sufficiently, the index 170 may be left inserted in the optical path $s_2$ in a fixed position.

When the effective rays of light for illumination is eclipsed by the index 170 with the front lens 111b inserted in the optical path $s_2$, or when the image of the index does not cover the CCD sensor 119 because the size of the projected image of the index 170 is not appropriate, the index 170 is removed from the optical path $s_2$ according to the change of the observation magnification of the object lens 116a or 116b.

Hereinafter, the mechanism for inserting and removing the index 170 according to the change of the observation magnification of the object lens 161a or 161b will be described by reference to the overall configuration of the microscope shown in FIG. 23. The CPU 71 has the function of serving as condenser lens changing means that receives the select signal pertaining to the type and magnification of the object lens 161a or 161b sent from the external controller 28 and sends an object lens change signal to a revolver driving unit 162 on the basis of the select signal. In addition to sending an object lens change signal to the revolver driving unit 162, the CPU 171 has the function of sending to a condenser lens driving unit 163 a judgment signal as to whether the front lens 111b of the condenser lens 111 is inserted or removed according to the observation magnification of the object lens 161a or 161b, that is, the function of sending to the condenser lens driving unit 163 a judgment signal for inserting the front lens 111b in the optical path $s_2$ in the case of high magnification object lenses and sending to the condenser lens driving unit 163 a judgment signal for removing the front lens 111b from the optical path $s_2$ in the case of low magnification object lenses.

In addition to changing the object lens and inserting and removing the front lens 111b, the CPU 171 has the function of serving as index inserting and removing means that sends to an index driving unit 172 a signal for removing the index 170 from the optical path $s_1$ when the front lens 111b of the condenser lens 111 is inserted in the optical path $s_2$ and sends to the index driving unit 172 a signal for inserting the index 170 into the optical path $s_1$ when the front lens 111b of the condenser lens 111 is removed from the optical path $s_2$.

Next, the operation of the microscope thus constructed will be explained. To change the observation magnification of object lens 161a or 161b, either the object lens 161a or 161b suitable for the desired observation magnification is selected at the external controller 128. When the external controller 128 has sent the select signal concerning the type and magnification of the selected object lens 161a or 161b to the CPU 171, the CPU 171, on the basis of the select signal, sends the object lens change signal to the revolver driving unit 162, that is, sends the object lens change signal of the object lens 161a in the case of high magnification and the object lens change signal of the object lens 161b in the case of low magnification.

As a result of the operation of the revolver 160 driven by the revolver driving unit 162, the object lens 161a or 161b with the desired observation magnification is put in the optical path $s_3$. At the same time, the CPU 171 sends to the condenser lens driving unit 163 a judgment signal for inserting the front lens 111b in the optical path $s_2$ when the high magnification object lens 161a has been selected or sends to the condenser lens driving unit 163 a judgment signal for removing the front lens 111b from the optical path $s_2$ when the low magnification object lens 161b has been selected. As a result, the front lens 111b of the condenser lens 111 is driven by the condenser lens driving unit 163 in such manner that the front lens is inserted in the optical path $s_2$ in the case of the high magnification object lens 161a and is removed from the optical path $s_2$ in the case of the low magnification object lens 161b.

Furthermore, in addition to changing the object lens and inserting and removing the front lens 111b, the CPU 171 sends to the index driving unit 172 a signal for removing the index 170 from the optical path $s_1$ when the front lens 111b of the condenser lens 111 is inserted in the optical path $s_2$ and sends to the index driving unit 172 a signal for inserting the index 170 into the optical path $s_1$ when the front lens 111b is removed from the optical path $s_2$. As a result, the index 170 is driven by the index driving unit 172 in such a manner that the index is removed from the optical path $s_1$ in the case of the high magnification object lens 161a and is inserted in the optical path $s_1$ in the case of the low magnification object lens 161b.

Therefore, when the high magnification object lens 161a is selected, the front lens 111b of the condenser lens 111 is inserted into the optical path $s_2$ and the index 170 is removed from the optical path $s_1$, so that the image of the field stop 106 is projected on the surface of the specimen 102. The luminous flux $s_3$ from the specimen 102 passes through the object lens 161a and image formation lens 113 and reaches the optical path branch member 114. The optical path branch member 114 directs part of the luminous flux $s_3$ from the specimen 102 to the eyepiece 115 and the remaining luminous flux to the split prism 118 via the mirror 116 and image formation lens 117. The split prism 118 divides the incident luminous flux in two and sends to the CCD sensor 119 these two luminous fluxes in parallel. The CCD sensor 119 outputs an analog signal having the voltage level corresponding to the amount of incident light of the projected images (the front focus image and back focus image) and the accumulation time. The analog processing section 120 performs an analog process on the analog signals outputted from the CCD sensor 119 in a manner that amplifies and filters the front focus image and back focus image separately. The output signals of the analog processing section 120 are digitized by the A/D converter 121. The digitized signals are sent to the memory 122, which stores the front focus image and back focus image separately. The computation circuit 123 reads the front focus image and back focus image digital signals stored in the memory 122, calculates the contrast value between the front focus image and back focus image using the front focus image and back focus image digital signals, and computes from the contrast value the amount of defocus indicating the degree of focusing of the field stop 106. The CPU 124 takes in the defocus signal obtained at the computation circuit 123, computes on the basis of the defocus signal the movement of the stage 1 and the direction of its movement to bring the image of the field stop 106 to the in-focus position, and sends the signal pertaining to the movement and the direction of movement to the driving circuit 125. As a result, the stage 1 moves up and down. When the front focus image and back focus image that are projected on the light-receiving surface of the CCD sensor 119 take the same shape, the image of the field stop 106 is in the in-focus position.

On the other hand, when the low magnification object lens 161b has been selected, the front lens 111b of the condenser lens 111 is removed from the optical path $s_2$ and the index 170 is inserted into the optical path $s_1$, so that the image of the index 170 is projected on the surface of the specimen 102 as shown in FIG. 24. As with the high magnification object lens 161a, the luminous flux $s_3$ from the specimen 102 passes through the object lens 161a, image formation lens 113, and image formation lens 117, and is directed to the split prism 118. The split prism divides the flux in two and sends these two fluxes to the CCD sensor 119. The CCD sensor 119 outputs analog signals having the voltage level corresponding to the amount of incident light of the projected images (the front focus image and back focus image) and the accumulation time. After the processing at the analog processing section 120, the front focus image and back focus image digital signals are stored in the memory separately. The computation circuit 123 calculates the contrast value between the front focus image and back focus image using the front focus image and back focus image digital signals, and computes from the contrast value the amount of defocus indicating the degree of focusing of the field stop 106. The CPU 124 takes in the defocus signal obtained at the computation circuit 123, computes on the basis of the defocus signal the movement of the stage 1 and the direction of its movement to bring the image of the field stop 106 to the in-focus position, and sends the signal pertaining to the movement and the direction of movement to the driving circuit 125. As a result, the stage 1 moves up and down. When the front focus image and back focus image that are projected on the light-receiving surface of the CCD sensor 119 take the same shape, the image of the index 170 is in the in-focus position.

When the front lens 111b is inserted in the optical path $s_2$, the field stop 106 is driven by the field stop driver 8 according to the observation magnification of the object lens 161a under the control of the CPU 171 so that the field stop may be set to a suitable size. With the front lens 111b removed from the optical path $s_2$, when the effective rays of illumination light are eclipsed or shaded by the field stop 106, the field stop 106 may be opened interlocking with the change of the object lens to the extent that the effective rays of illumination light are not eclipsed.

Furthermore, with the front lens 111b inserted in the optical path $s_2$, when the image of the index 170 is an obstacle to observation, the index 170 may be inserted into the optical path $s_1$ only in the automatic focal point adjustment operation by means of the CPU 171 and index driving unit 172, interlocking with the start/stop signal of automatic focal point adjustment operation inputted from the external controller 128.

In this way, the index 170 is inserted into or removed from the optical path $s_1$ by means of the CPU 171 and index driving unit 172, interlocking with various operations. When the index 170 is a near-circular opening and closing index whose diameter is variable, if the index 170 is not used, its diameter may be made larger so as not to shade the effective rays of light.

As described above, with the twelfth embodiment, because the index 170 is placed in the conjugate position to the surface of the specimen 102 with respect to the condenser lens 111 having a different focal length, automatic focal point adjustment can be made from low magnification observation to high magnification observation by projecting the image of the index 170 on the surface of the specimen 102 and sensing the contrast, even with the condenser lens 111 in the case where the field stop 106 cannot be projected on the surface of the specimen 102.

Furthermore, since the insertion and removal of the front lens 111b of the condenser lens 111, the opening and closing of the field stop 106, and the insertion and removal of the index 170 is performed interlocking with the change of the object lenses 161a, 161b, the index 170 obtains the optimum illumination from low magnification observation to high magnification observation without the effective rays of illumination light being eclipsed by the field stop 106. Because the operation is simplified, not complicated, the observer can concentrate on observation with the microscope. Since the projection optical system of the index 170 does not need a special optical path and shares the axis with the transmission illumination optical system, it is not necessary to insert or remove an optical element, such as a mirror or a lens, in the automated focal point adjustment operation, which achieves a simple, low-cost configuration with the single light source 103. Furthermore, because the special index projection optical system need not be directed by a half mirror or the like concentrically with the transmission illumination optical system, both of the image of the index 170 and the observed image are free from the loss of illumination, which leads to a high illumination efficiency, providing a bright index image and observed image.

Figure 25:
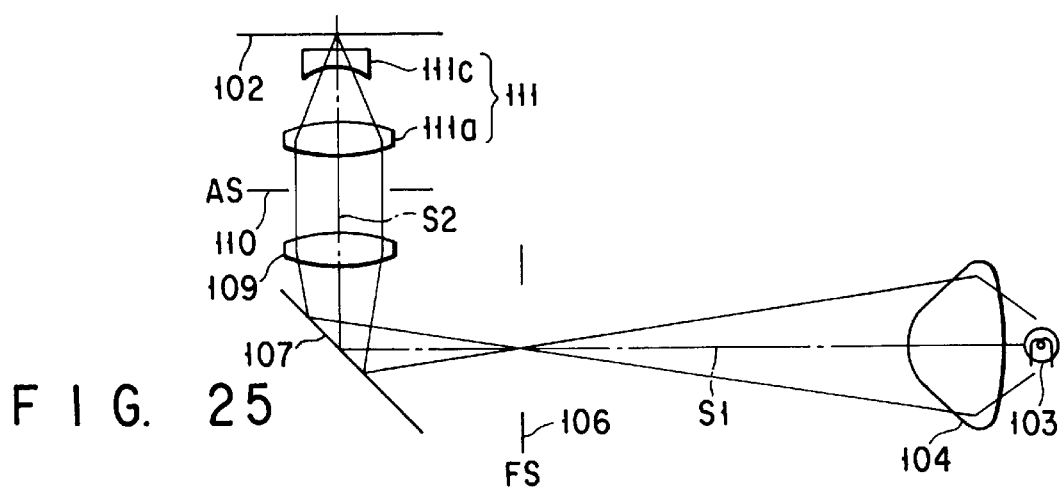
FIG. 25 is a schematic diagram of a thirteenth embodiment of the present invention.
Figure 26:
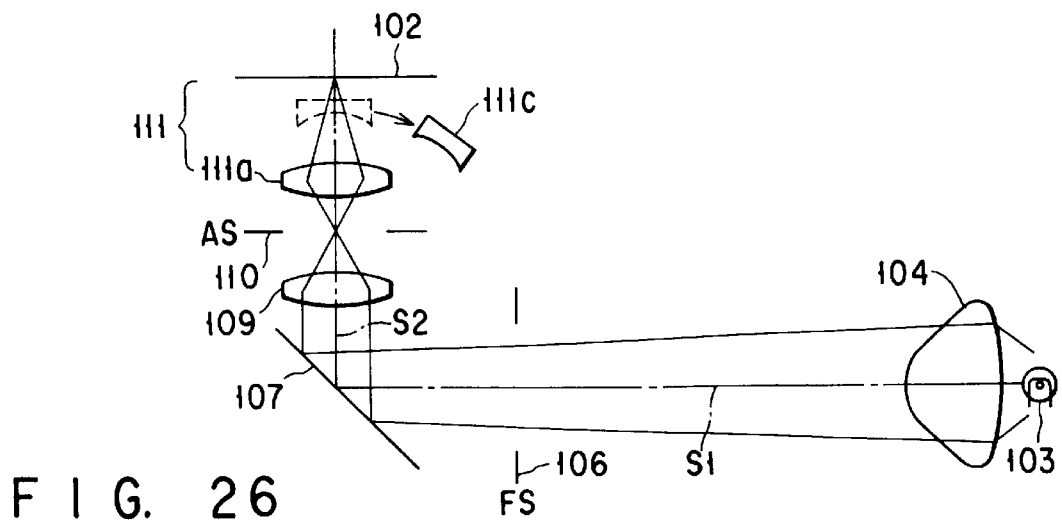
FIG. 26 is a schematic diagram of the configuration of the microscope with a high-magnification object lens in the eleventh embodiment.

Next, a thirteenth embodiment of the present invention will be described by reference to FIG. 25 and FIG. 26. In FIG. 25 and FIG. 26, the same parts as in the overall configuration of the microscope of FIG. 23 are indicated by the same reference symbols and a detailed explanation of them will not be given. Explanation will be given, centered on each part of the index projection and transmission illumination optical system including a condenser lens by which the present invention is characterized.

FIGS. 25 and 26 are schematic diagrams of the index projection and transmission illumination optical system in a microscope to which an automatic focal point adjustment apparatus is applied. FIG. 25 shows the case of illumination suitable for a low magnification object lens 161b. FIG. 26 shows the case of illumination suitable for a high magnification object lens 161a. As shown in FIG. 25, the section from a light source 103 to an aperture diaphragm 110 has the same structure as that of the microscope of FIG. 23 and provides Köhler illumination. The condenser lens 111 is composed of a convex condenser lens 111a and a concave front lens 111c. The front lens 111c can be inserted into and removed from the optical path $s_2$ according to the observation magnification of the object lenses 161a, 161b. As shown in FIG. 25, when the low magnification object lens 161b is used with the front lens 111c inserted in the optical path $s_2$, the image of the field stop 106 illuminated by means of the light source 103 and collector lens 104 is projected on the surface of the specimen 102. As in the tenth embodiment, automatic focal point adjustment is made by sensing the contrast of the image of the field stop 106.

On the other hand, in FIG. 26, with the front lens 111c inserted in the optical path $s_2$ under illumination by the low magnification object lens 161b, the front lens 111c is removed from the optical path $s_2$. Since the front lens 111c is a convex lens, removal of the front lens from the optical path $s_2$ makes the focal length of the condenser lens 111 shorter, providing critical illumination suitable for high magnification lenses. In this case, the plane optically conjugate to the specimen 102 coincides with the aperture diaphragm 110 and the image of the aperture diaphragm 110 is projected on the specimen 102. Because the image of the aperture diaphragm 110 is projected on the surface of the specimen 102, automatic focal point adjustment is made by sensing the contrast of the image of the aperture diaphragm 110, bringing the specimen 102 into focus.

As described above, with the thirteenth embodiment, because two indexes, that is, the field stop 106 and the aperture diaphragm 110, are placed in the positions conjugate to the specimen 102 with respect the condenser lens having two different focal lengths, even when the condenser lens 111 is composed of the convex condenser lens 111a and the concave front lens 111a and the low magnification object lens is changed to the high magnification object lens or vice versa, the image of the field stop 106 or the aperture diaphragm 10 can be projected on the surface of the specimen 102, bringing the specimen 102 into focus. Moreover, use of the field stop 106 or aperture diaphragm 110 as an index eliminates the necessity of providing a special index for index projection, enabling the apparatus to be constructed at low cost.

Furthermore, as with the twelfth embodiment, with the eleventh embodiment, the insertion and removal of the front lens 111b and the opening and closing of the field stop 106 and aperture diaphragm 1110 may be performed interlocking with the change of the object lenses 161a, 161b, as the need arises. This enables the optimum illumination from low magnification observation to high magnification observation. Moreover, the operation is simplified, not complicated, the observer can concentrate on observation with the microscope.

Next, a fourteenth embodiment of the present invention will be described by reference to FIG. 27 and FIG. 28. In FIG. 27 and FIG. 28, the same parts as in the overall configuration of the microscope of FIG. 23 are indicated by the same reference symbols and a detailed explanation of them will not be given. Explanation will be given, centered on each part of the index projection and transmission illumination optical system including a condenser lens 111 by which the present invention is characterized. FIGS. 27 and 28 are schematic diagrams of the twelfth embodiment of the index projection and transmission illumination optical system in a microscope to which an automatic focal point adjustment apparatus is applied. FIG. 27 shows the case where the front lens is removed. FIG. 28 shows the case where the front lens is inserted. The microscope uses an illumination system for very low magnification object lenses, such as a 1×object lens. The section ranging from a light source 103 to an aperture diaphragm 110 has the same configuration and operates in the same manner as the eleventh embodiment. The condenser lens 111 is for very low magnification illumination only, and therefore has a single set structure with a very long focal length. The image of the field stop 106 is projected above the specimen 102 (on the side of the object lens) as shown in FIG. 27. A field stop projection lens (hereinafter, referred to as the FS projection lens) 171 is provided in the optical path $s_2$ above the condenser lens 111 so that the field stop projection lens can be inserted and removed.

With the FS projection lens 171 inserted in the optical path $s_2$ as shown in FIG. 28, the field stop 106 is projected on the surface of the specimen 102. When the FS projection lens 171 is inserted in the optical path $s_2$, the illumination performance is not necessarily maintained. The image of the field stop 106 has only to be projected clearly on the surface of the specimen 102.

With this configuration, during normal observation, the FS projection lens 171 is removed from the optical path $s_2$ as shown in FIG. 27, and the illumination performance enough to meet the numerical aperture NA of the very low magnification object lens is maintained. Only in an automatic focal point adjustment operation, the FS projection lens 171 is inserted in the optical path $s_2$, interlocking with the automatic focal point adjustment operation. The FS projection lens 171 projects the image of the field stop 106 on the surface of the specimen 102. By sensing the contrast of the image of the field stop 106, automatic focal point adjustment is made. After the automatic focal point adjustment has been completed, the FS projection lens 171 is removed from the optical path $s_2$, and a normal observation is made.

With the fourteenth embodiment, the FS projection lens 171 in the illumination system is inserted into and removed from the optical path $s_2$, interlocking with the automatic focal point adjustment operation, the image of the field stop 106 is projected on the surface of the specimen 102 only during the automatic focal point adjustment operation, and the automatic focal point adjustment operation is carried out by sensing the contrast of the image of the field stop 106. Therefore, in normal observation, it is possible to maintain a sufficient illumination performance. When the index cannot be placed in the desired position because of a spatial problem or a damage problem arising from the conjugate position close to the light source 103 even if the index is placed in the position conjugate to the specimen 102, the index can be projected on the surface of the specimen 102 by projecting the image of the field stop 106 through the insertion and removal of the FS projection lens 171 or by placing the index in the desired position through the combination of the position of the FS projection lens 171 to be inserted or removed and its power. Because the insertion and removal of the FS projection lens 171 is interlocked with the automatic focal point adjustment operation, there is no possibility that the specimen 102 will be observed with the condenser lens 111 in the automatic focal point adjustment operation by mistake.

As described so far in detail, with the present invention, it is possible to provide a low-cost automatic focus adjustment method and apparatus which bring even a low contrast specimen into focus with high accuracy even if deposits adhere to the optical system of the microscope, without being affected by the deposits.

Furthermore, with the present invention, it is possible to provide an automatic focus adjustment method and apparatus which can make an automatic focal point adjustment from low magnification observation and high magnification observation by projecting the image of the index on the surface of the specimen and sensing the contrast, even when the field stop cannot be projected on the surface of the specimen in a case where a condenser lens with a different focal length is used.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A focal point adjustment apparatus applied to a microscope with a transmission illumination optical system having a light source, a field stop, a lens unit and a condenser lens, comprising:
   an object lens;
   a stage on which a glass slide, on which a subject is put for measurement, is placed;
   a marker projection means using said field stop of said transmission illumination optical system, for projecting a field stop image as a marker on the glass slide;
   holding means for holding as a reference data, the position in which a first field stop image on a reference glass slide is formed by said marker projection means;
   amount-of-defocus sensing means for sensing an amount of defocus between measurement data indicating the position in which a second field stop image is formed on an actual glass slide for measurement and the reference data stored in said holding means, said second field stop image being projected by said marker projection means;
   computing means for calculating a thickness of said actual glass slide for measurement on the basis of the amount of defocus sensed by said amount-of-defocus sensing means;
   determining means for determining data on the distance between said object lens and said stage on the basis of the thickness of said actual glass slide for measurement provided by said computing means; and
   focusing means for adjusting the distance between said object lens and said stage on the basis of the data on the distance between said object lens and said stage determined by said determining means.

2. The focal point adjustment apparatus according to claim 1, wherein said condenser lens includes a front lens inserted in an optical path of said transmission illumination optical system, so as to change a focal length of said condenser lens.

3. The focal point adjustment apparatus according to claim 1, wherein said object lens is provided in the microscope and moves up and down.

4. The focal point adjustment apparatus according to claim 1, further comprising an index plate provided in a conjugate position with respect to said field stop, for projecting an index image as the marker on the glass slide.

* * * * *